United States Patent
Watson et al.

(10) Patent No.: US 10,642,566 B2
(45) Date of Patent: *May 5, 2020

(54) METHODS AND SYSTEMS FOR SOCIAL SHARING HEAD MOUNTED DISPLAY (HMD) CONTENT WITH A SECOND SCREEN

(71) Applicant: Sony Interactive Entertainment Inc., Tokyo (JP)

(72) Inventors: Brian Watson, Burlingame, CA (US); Anton Mikhailov, Foster City, CA (US); Jeffrey Stafford, Redwood City, CA (US); Glenn Black, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/438,338

(22) Filed: Jun. 11, 2019

(65) Prior Publication Data
US 2019/0294405 A1 Sep. 26, 2019

Related U.S. Application Data

(63) Continuation of application No. 15/635,035, filed on Jun. 27, 2017, now Pat. No. 10,318,230, which is a
(Continued)

(51) Int. Cl.
*G02B 27/22* (2018.01)
*G02B 27/00* (2006.01)
(Continued)

(52) U.S. Cl.
CPC .......... *G06F 3/1454* (2013.01); *A63F 13/213* (2014.09); *A63F 13/26* (2014.09);
(Continued)

(58) Field of Classification Search
None
See application file for complete search history.

(56) References Cited

U.S. PATENT DOCUMENTS

2006/0116185 A1* 6/2006 Krull ................. A63F 13/10
463/4
2008/0303790 A1* 12/2008 Morimoto ............ A63F 13/10
345/157

(Continued)

*Primary Examiner* — Joni Richer
(74) *Attorney, Agent, or Firm* — Penilla IP, APC

(57) ABSTRACT

A media streaming device is provided. In one configuration, the media streaming device includes an interface for connecting the media streaming device to a display screen. A head mounted display (HMD) output for connecting to an HMD over a wireless connection provide by wireless communication circuitry. A processor for processing received video of interactive content. The processor is configured to format the video of interactive content for rendering on the display screen. A pass-through connection that is configured to interface the video of interactive content to the HMD via the HMD output over the wireless connection. The pass-through connection maintains a left-eye and right-eye format for rendering the video of interactive content in a three-dimensional format in the HMD.

15 Claims, 15 Drawing Sheets

Related U.S. Application Data continuation of application No. 14/270,257, filed on May 5, 2014, now Pat. No. 9,691,181.

(60) Provisional application No. 61/944,031, filed on Feb. 24, 2014.

(51) Int. Cl.

| | | |
|---|---|---|
| *G02B 27/01* | (2006.01) | |
| *G06F 3/14* | (2006.01) | |
| *G06F 3/01* | (2006.01) | |
| *A63F 13/213* | (2014.01) | |
| *A63F 13/86* | (2014.01) | |
| *A63F 13/53* | (2014.01) | |
| *A63F 13/27* | (2014.01) | |
| *A63F 13/26* | (2014.01) | |
| *G06T 1/20* | (2006.01) | |
| *G06T 19/00* | (2011.01) | |
| *A63F 13/54* | (2014.01) | |
| *G06F 3/00* | (2006.01) | |
| *G06T 19/20* | (2011.01) | |

(52) U.S. Cl.
CPC ............ *A63F 13/27* (2014.09); *A63F 13/53* (2014.09); *A63F 13/54* (2014.09); *A63F 13/86* (2014.09); *G02B 27/0093* (2013.01); *G02B 27/01* (2013.01); *G02B 27/017* (2013.01); *G02B 27/2228* (2013.01); *G06F 3/002* (2013.01); *G06F 3/011* (2013.01); *G06F 3/012* (2013.01); *G06T 1/20* (2013.01); *G06T 19/006* (2013.01); *G06T 19/20* (2013.01); *A63F 2300/538* (2013.01); *G06T 2210/22* (2013.01); *G06T 2219/024* (2013.01); *G06T 2219/2016* (2013.01)

(56) References Cited

U.S. PATENT DOCUMENTS

| | | | | |
|---|---|---|---|---|
| 2011/0293144 | A1* | 12/2011 | Rahardja | A63F 13/10 |
| | | | | 382/103 |
| 2012/0176296 | A1* | 7/2012 | Border | G02B 27/2228 |
| | | | | 345/8 |
| 2012/0262558 | A1* | 10/2012 | Boger | G02B 27/0093 |
| | | | | 348/61 |
| 2013/0059654 | A1* | 3/2013 | Oh | A63F 13/77 |
| | | | | 463/29 |
| 2013/0150161 | A1* | 6/2013 | Kruglick | A63F 13/52 |
| | | | | 463/34 |
| 2013/0246946 | A1* | 9/2013 | Iwasaki | G06F 3/1454 |
| | | | | 715/761 |

* cited by examiner

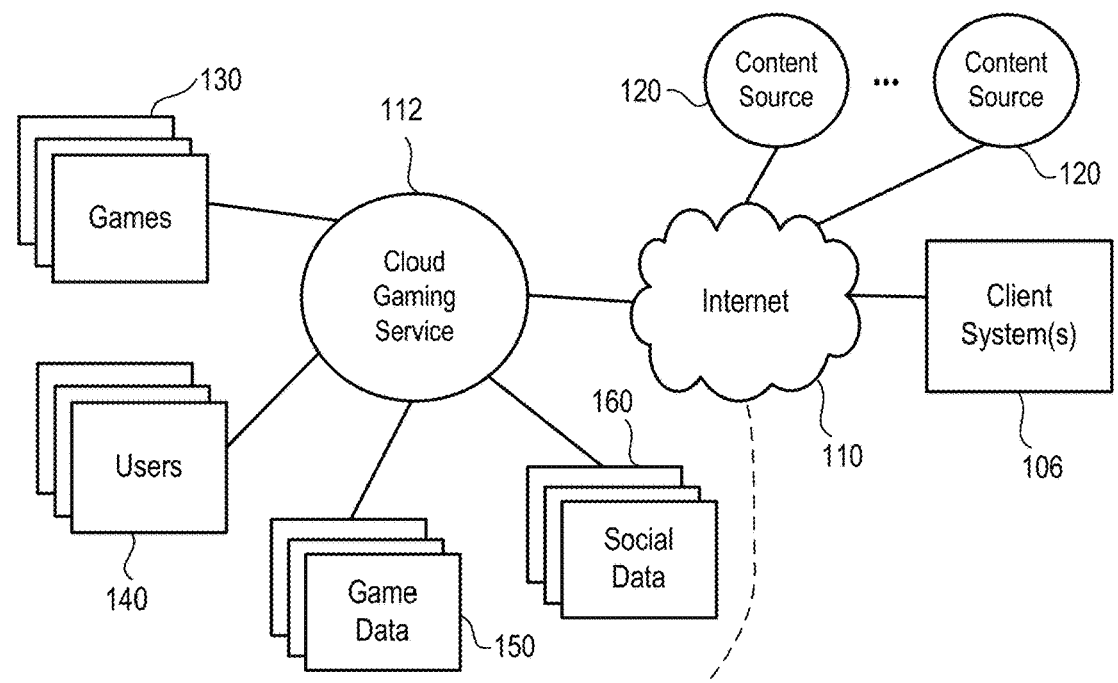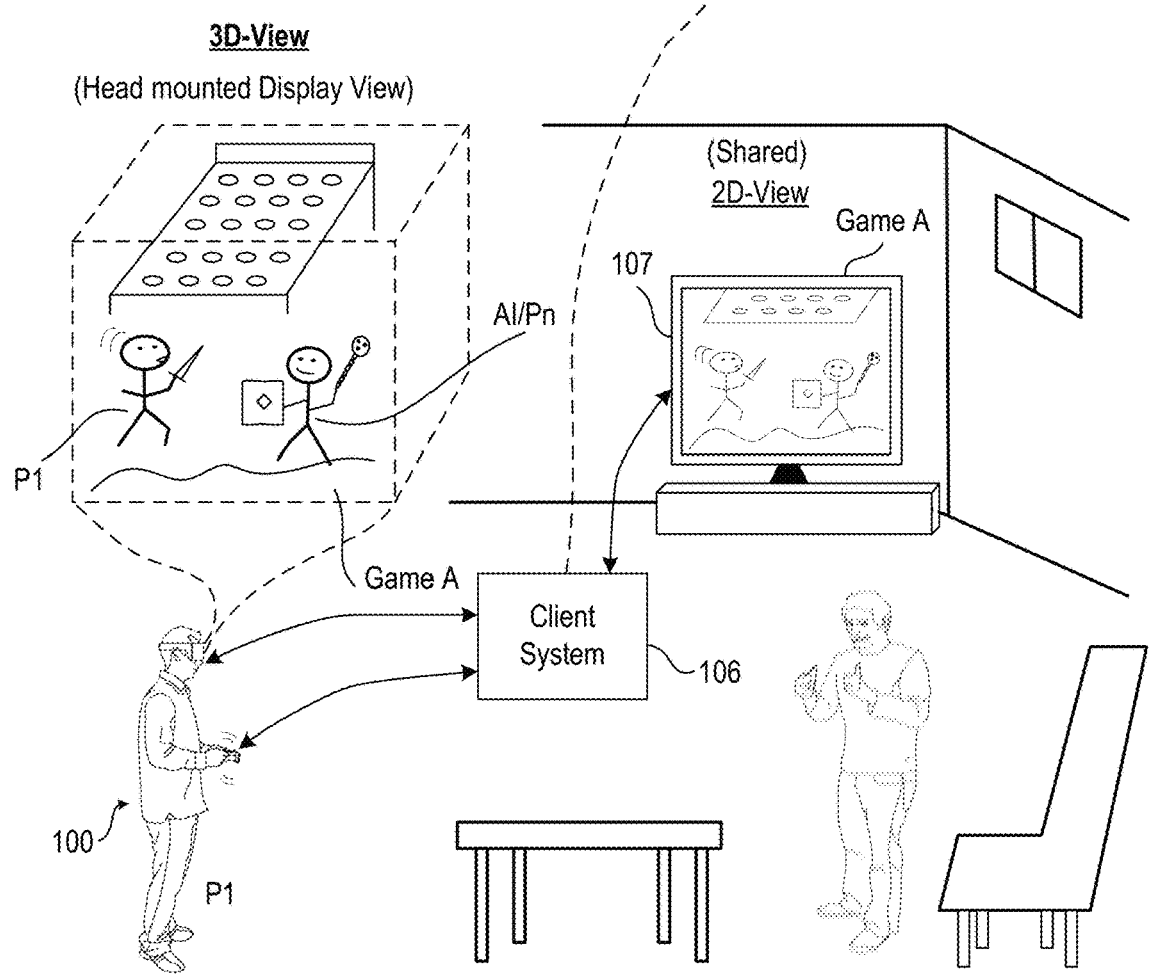
FIG. 2A

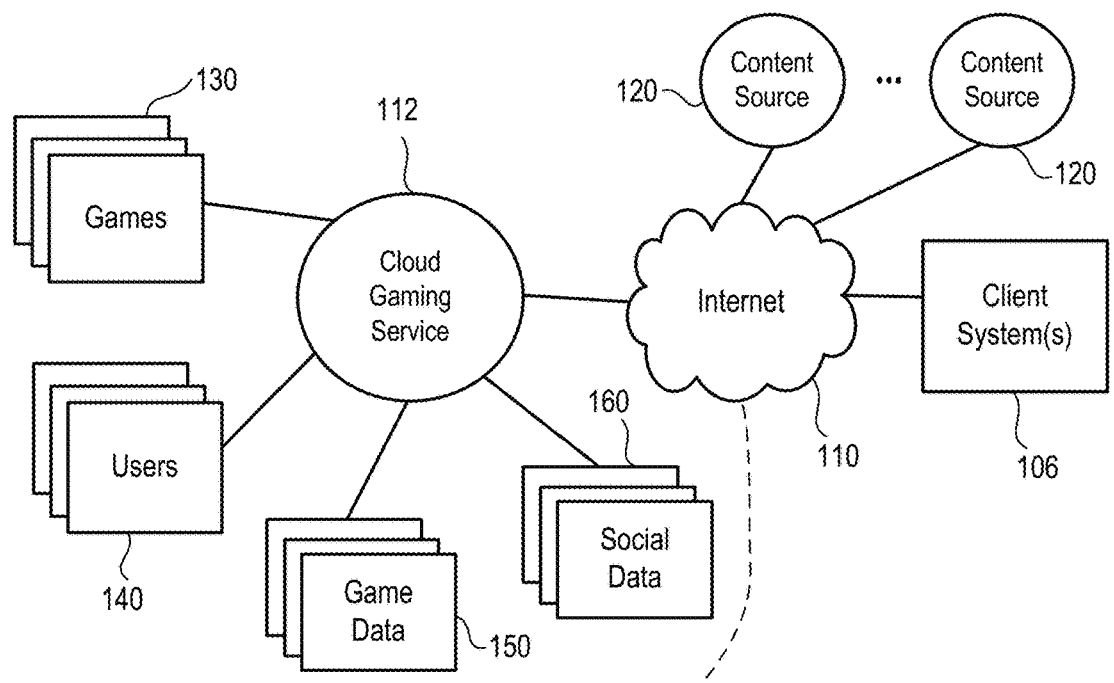
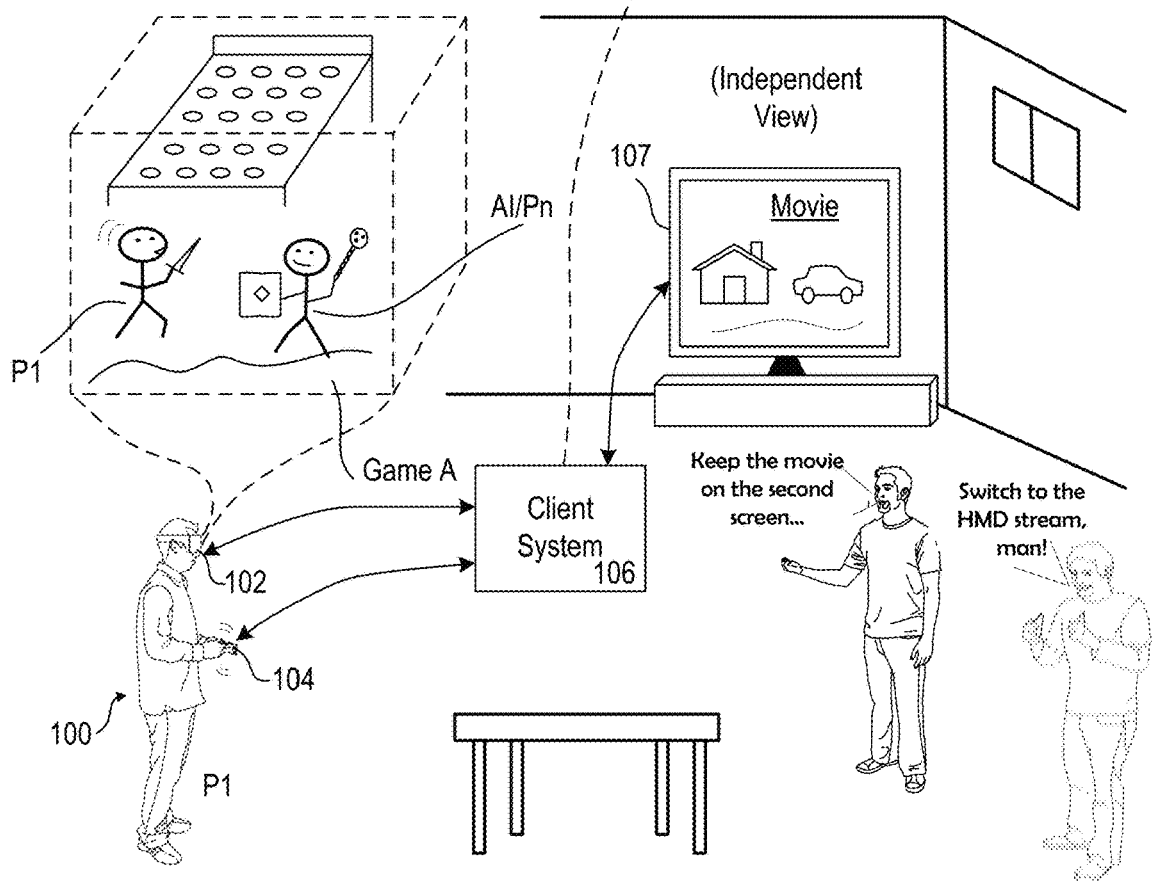
FIG. 2B

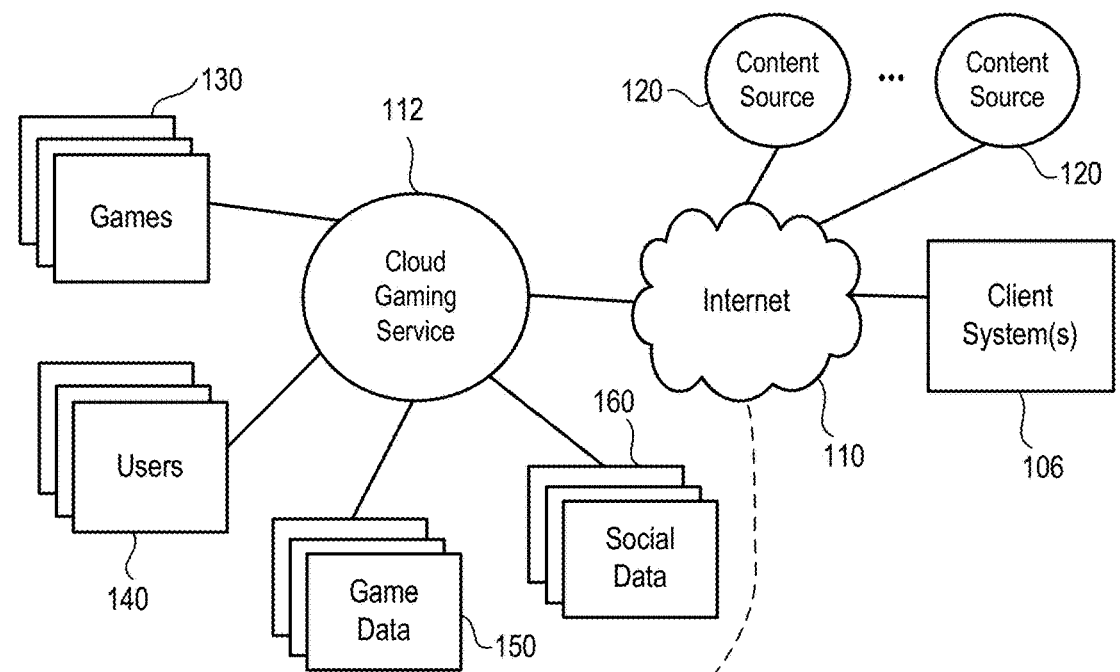
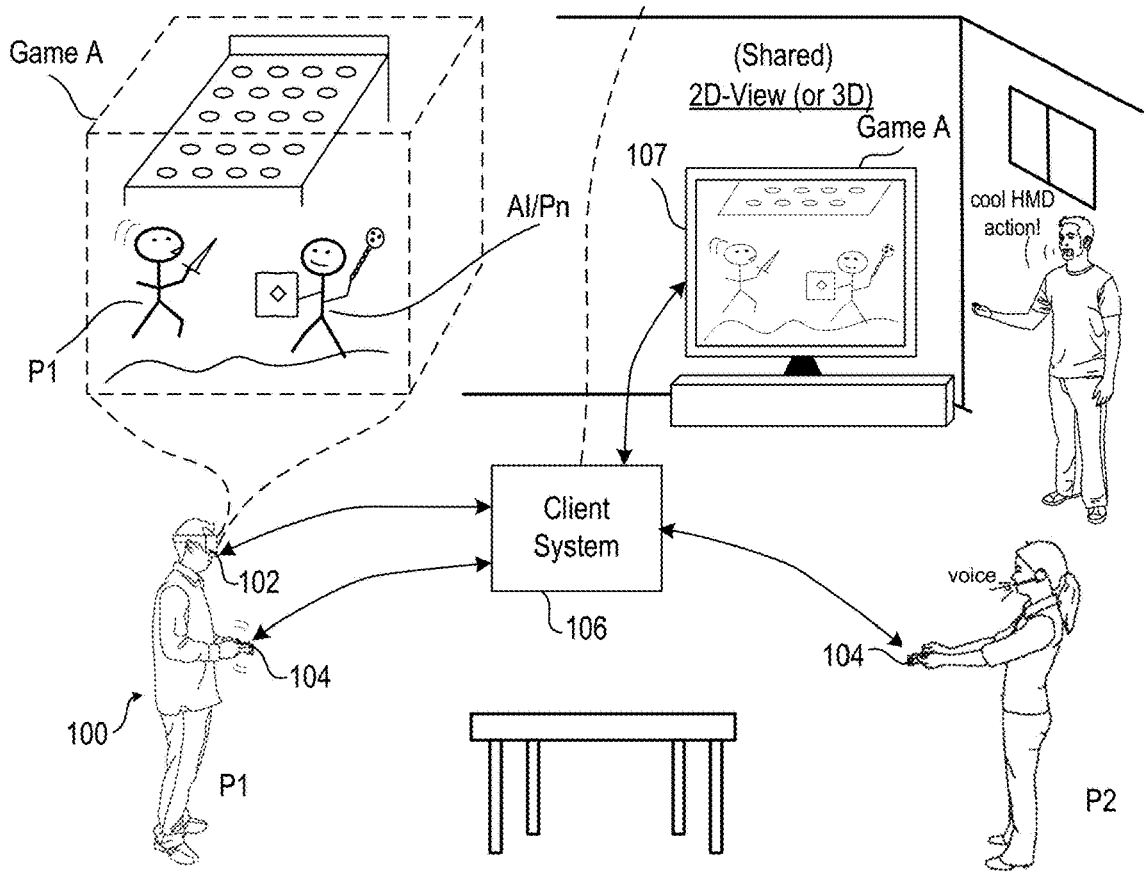
FIG. 2C

METHODS AND SYSTEMS FOR SOCIAL SHARING HEAD MOUNTED DISPLAY (HMD) CONTENT WITH A SECOND SCREEN

CLAIM OF PRIORITY

This application is a Continuation of U.S. patent application Ser. No. 15/635,035, filed on Jun. 27, 2017 (U.S. Pat. No. 10,318,230, issued on Jun. 11, 2019), entitled METHODS AND SYSTEMS FOR SOCIAL SHARING HEAD MOUNTED DISPLAY (HMD) CONTENT WITH A SECOND SCREEN, which is a further Continuation of U.S. patent application Ser. No. 14/270,257, filed on May 5, 2014, (U.S. Pat. No. 9,691,181, issued on Jun. 27, 2017), entitled "METHODS AND SYSTEMS FOR SOCIAL SHARING HEAD MOUNTED DISPLAY (HMD) CONTENT WITH A SECOND SCREEN," and which further claims priority from U.S. Provisional Patent Application No. 61/944,031, filed Feb. 24, 2014, and entitled "METHODS AND SYSTEMS FOR SOCIAL SHARING HEAD MOUNTED DISPLAY (HMD) CONTENT WITH A SECOND SCREEN," all of which are herein incorporated by reference.

BACKGROUND

1. Field of the Invention

The present invention relates to methods and systems for sharing gameplay to second screens.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming services and systems may include those provided by Sony Playstation®, which are currently sold as game consoles, portable game devices, and provided as services over the cloud. As is well known, the game console is designed to connect to a monitor (usually a television) and enable user interaction through handheld controllers. The game console is designed with specialized processing hardware, including a CPU, a graphics processor for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide an immersive experience to the user. However, the immersive experience is personal to the user wearing the HMD. As such, others in the vicinity of the user wearing the HMD cannot share in the experience.

It is in this context that embodiments of the invention arise.

SUMMARY

Embodiments of the present invention provide methods and systems for enabling head mounted displays (HMDs) to share game play or viewable content to a second screen. In some examples, the second screen is co-located with the HMD, and in others, the second screen is remote. It should be appreciated that the present invention can be implemented in numerous ways, such as a process, an apparatus, a system, a device or a method on a computer readable medium. Several inventive embodiments of the present invention are described below.

In one embodiment, a client system having a processor for generating video frames in response to interactive game play of a video game using the HMD is provided. The generated video frames include in-band regions that include the video game content (VGC) to be displayed on the HMD. A processing device having an input interface for receiving the generated video frames. The processing device including extract logic for extracting a portion of the generated video frames, and a codec unit configured to process the portion of the generated video frames. Further included is a graphics processor unit (GPU) for processing the portion of the generated video frames and formatting for display on the second screen. The portion of the generated video frames processed by the GPU being provided to a first output interface of the processing device. The generated video frames received via the input interface being provided as a pass-through to a second output interface of the processing device. The first output interface of the processing device is connectable to the second screen and the second output interface of the processing device is connectable to the HMD.

In another embodiment, a system for processing video frames generated for a head mounted display (HMD) for sharing to a second screen is provided. The system includes a client system having a processor for generating video frames in response to interactive game play of a video game using the HMD. The generated video frames include in-band regions that include the video game content (VGC) to be displayed on the HMD and out-of-band (OOB) regions. The system further includes a system-on-a-chip (SOC) processor having an input interface for receiving the generated video frames. The SOC processor includes a format module for formatting the received frames. Also included is a graphics processor unit (GPU) for selecting a portion of the generated video frames and formatting for display on the second screen. The formatted portion of the generated video frames are provided to a first output interface of the SOC processor. The portion of the generated video frames are provided to the second screen to substantially mirror of the video frames rendered on the HMD, in substantial real time. The system includes a pass-through interface for communicating the generated video frames between the input interface to a second output interface of the SOC processor. The first output interface of the SOC processor is connectable to the second screen and the second output interface of the SOC process is connectable to the HMD.

In another embodiment, a method for processing video frames generated for display on a head mounted display (HMD) is disclosed. The method includes receiving the video frames formatted for display on the HMD, and while passing the video frames to the HMD, selecting a portion of content from the video frames and processing the portion of the content for output to a second screen. The video frames viewed in the HMD are a result of interactive play executed for viewing on the HMD. The second screen configured to render an undistorted view of the interactive play on the HMD. In example, the method and system enable additional content to be rendered on the second screen (e.g., second screen content (SSC)).

In still another embodiment, a system for processing video frames generated for a head mounted display (HMD) for sharing to a second screen, is provided. The system includes a client system having a processor for generating video frames in response to interactive game play of a video game using the HMD. The generated video frames include in-band regions that include the video game content (VGC) to be displayed on the HMD and out-of-band (OOB) regions that include second screen content (SSC). The system also has a system-on-a-chip (SOC) processor, having an input interface for receiving the generated video frames. The SOC processor includes extract logic for extracting the SSC from the out-of-band regions and a graphics processor unit (GPU) for selecting a portion of the generated video frames and formatting for display on the second screen. The extracted SSC and the portion of the generated video frames are provided to a first output interface of the SOC processor. The generated video frames received via the input interface that is provided as a pass-through to a second output interface of the SOC processor. The first output interface of the SOC processor is connectable to the second screen and the second output interface of the SOC process is connectable to the HMD.

In yet another embodiment, a system for processing video frames generated for a head mounted display (HMD) for sharing to a second screen, is provided. The system includes a client system having a processor for generating video frames in response to interactive game play of a video game using the HMD. The generated video frames include in-band regions that include the video game content (VGC) to be displayed on the HMD. The system also includes a system-on-a-chip (SOC) processor having an input interface for receiving the generated video frames. The SOC processor includes a USB input for receiving video frames including second screen content (SSC) and extract logic for extracting the SSC from video frames. The system further has a codec unit configured to receive the video frames and the extracted SSC. A graphics processor unit (GPU) is included for selecting a portion of the generated video frames and formatting for display on the second screen. The extracted SSC and the portion of the generated video frames is provided to a first output interface of the SOC processor. The generated video frames received via the input interface is provided as a pass-through to a second output interface of the SOC processor. The first output interface of the SOC processor is connectable to the second screen and the second output interface of the SOC process is connectable to the HMD.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

FIGS. 2A-2C illustrate examples of HMD play and second screen sharing and generation of second screen content that is shared to the second screen and HMD, in accordance with an embodiment of the invention.

DETAILED DESCRIPTION

Figure 1A:
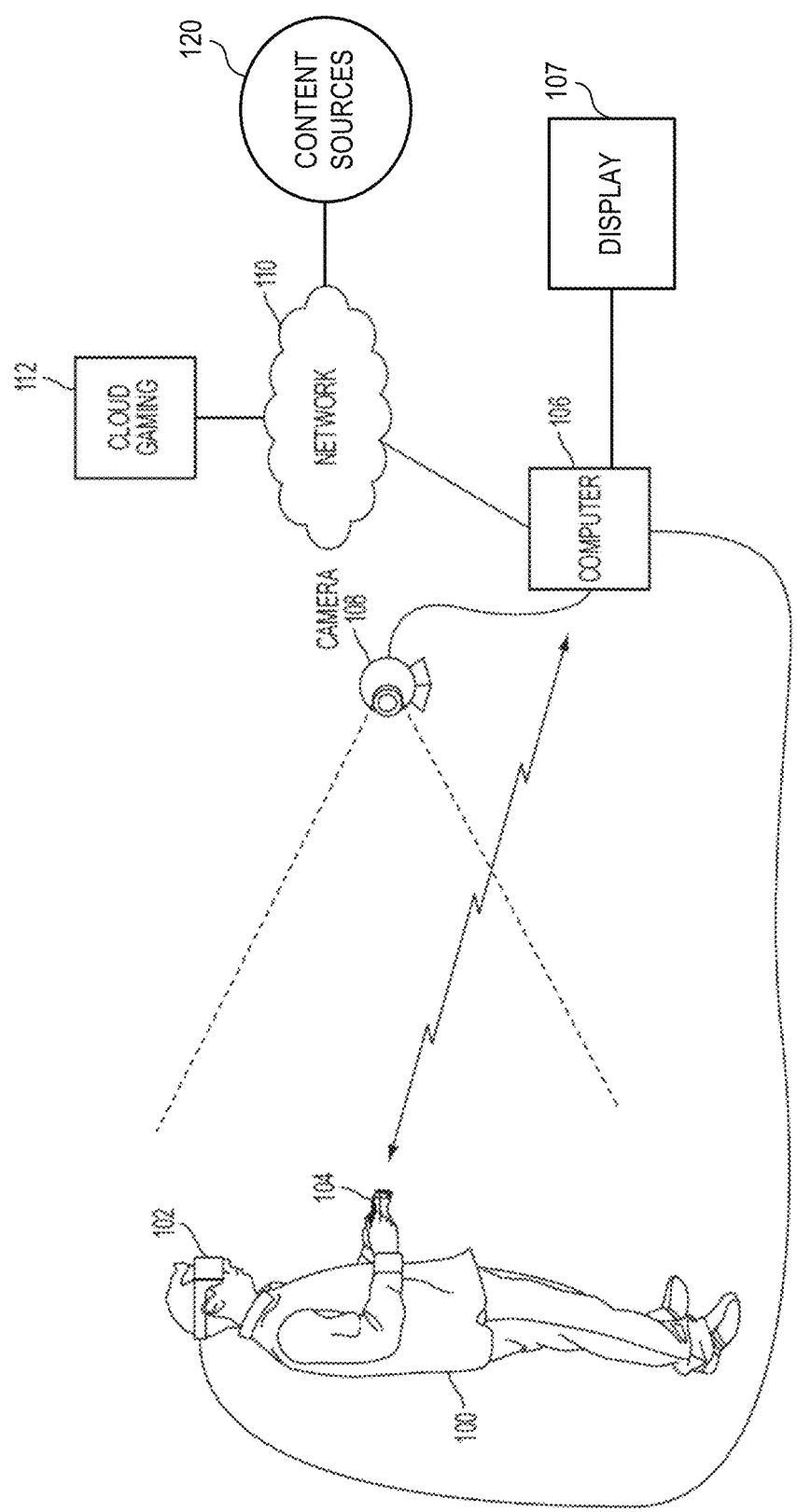
FIG. 1A illustrates a system for interactive gameplay of a video game, in accordance with an embodiment of the invention.

In one embodiment, the systems and methods described herein provide for ways of allowing users of head mounted displays (HMDs), who may be playing a game or viewing content to share the experience on a second screen. In some embodiments, the second screen is co-located with the HMD, and in others, the second screen is remote. It will be obvious, however, to one skilled in the art, that the present invention may be practiced without some or all of these specific details. In other instances, well known process operations have not been described in detail in order not to unnecessarily obscure the present invention.

Sharing HMD video of game play to a second screen will allow other users and/or spectators to socially interact and better experience the play events and/or action experienced by the HMD wearing player. In one embodiment, the content being viewed in the HMD is a rich and immersive 3D environment. The video stream that is generated and sent to the HMD for display can, in one embodiment, be split and processed for substantial simultaneous display on a second screen.

In one embodiment, the second screen can be, for instance, a television display that may be proximate to the user wearing the HMD. As such, other people that may be co-located or remote, in one embodiment, may view the action being shown in the HMD also on the second screen. The remote user may be any number of users that are able to play a game, comment on a game, or participate socially in some way with game play. As such, many remote users may be able to access and/or play the game being rendered on the HMD. The remote users can gain access to the game, for example, by accessing their gaming account or session and participating over a network, e.g., such as via the Internet. The remote users, in one embodiment, may be accessing the game in a live streaming mode, wherein the client system of the HMD is rendering the game and streaming the game to other users. In yet another embodiment, the HMD user is also accessing a cloud streaming version of the game, along with any number of remote users.

In one example, an HMD user's first person 3D view can be streamed live to UStream/Twitch/Gaikai etc., in 2D or 3D and watched by many users (public broadcast) or friends (selected broadcast). The watching users can, in one embodiment, participate in game play and/or comment or communicate with each other.

As used herein, the second screen can include any type of device having a display. The display may be one connected to a gaming console (local or remote), a personal computer, a laptop, a tablet computer, a mobile device, a cellular phone, a thin client, a set-top box, a media streaming device, a wearable device, a projection device, etc.

In one embodiment, the video content that is generated for the HMD can be split and/or intercepted and processed for display on the second screen. The display on the second screen can be, for example, in 2D, while the content in the HMD is shown in 3D. In some embodiments, the content shown on the second screen can also be in 3D format. In an example, users viewing the content on the second screen may optionally also interact with the game play, such as by joining the game as a player, by moving characters and/or objects in the game, by providing texts comments, by drawing lines, outlines, markings, and/or tags in the scene, and/or directly competing/participating in the same game that the user wearing the HMD is playing.

If the user wearing the HMD is viewing some multimedia content (e.g., a movie, video clip, advertisement, contest, game, social media content (e.g., posting, messages, media streams, friend events and/or game play) video portion and/or audio), the user viewing the second screen can also interact with the HMD user. In one example, the user viewing the second screen can decide when a good time may be to interrupt, pose a question, send a message, or participate in the experience. Without such second screen view, users are generally unable to see or experience what an HMD user is experiencing, which reduces opportunities to socialize with other users that may wish to contribute to the immersive experience of the HMD user.

As such, by providing this functionality and system, the game play using the HMD can be more social, thereby improving the interest in HMD-type games. In still other embodiments, the computer/console can include logic to enable different content to be processed by the same computer rendering the HMD game, while passing the different content to the second screen. For example only, the system would allow the computing device to process an HMD game and also render streaming movies from an online media content provider. In one example, the computer can itself include logic for processing the splitting of content delivery or the logic can be disposed in a separate hardware device.

In the examples described below, the computer 106 can be defined by a client system 106a (e.g., a game console) and a system on a chip (SOC) processor 106b (e.g., hardware device with I/O connectors). The SOC processor can include the logic and circuitry for interfacing/receiving the output of the client system 106a and processing the output to deliver (a) the HMD 3D video stream and (b) the video stream that is provided to a second screen 107. The SOC processor 106b, in one embodiment, may include I/O connectors that receive the video output of the client system 106a. The SOC processor 106b will include hardware and/or logic that is processed for taking the video input received from the client system 106a and processes the video input to format video output for the second screen, which may plug into the SOC processor 106b. The SOC processor 106b, will also include logic and/or hardware for passing through the video input to the HMD 102.

In one embodiment, the SOC processor 106b will format the video output for the second screen 107, so that a 2D format can be provided for display. This processing is performed, as the output of the client system 106a, in one embodiment, is producing 3D formatted video output, which is formatted for display on the HMD 102. Accordingly, in one embodiment, the SOC processor 106b may include an input I/O that connects to the client system 106a and at least two output I/Os that respectively connect to the HMD 102 and the second screen 107. In one embodiment, the output I/O that connects to the HMD 102 is wired or can be wireless. It should be understood, however, that the client system 106a and the SOC processor 106b may be integrated together in one system, if desired.

FIG. 1A illustrates a system for interactive gameplay of a video game, in accordance with an embodiment of the invention. A user 100 is shown wearing a head-mounted display (HMD) 102. The HMD 102 is worn in a manner similar to glasses, goggles, or a helmet, and is configured to display a video game or other content to the user 100. The HMD 102 is configured to provide an immersive experience to the user by virtue of its provision of display mechanisms in close proximity to the user's eyes and the format of the content delivered to the HMD. In one example, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer, including but not limited to, a gaming console, personal computer, laptop, tablet computer, mobile device, cellular phone, tablet, thin client, set-top box, media streaming device, etc. In some embodiments, the HMD 102 can connect directly to the internet, which may allow for cloud gaming without the need for a separate local computer. In one embodiment, the computer 106 can be configured to execute a video game (and other digital content), and output the video and audio from the video game for rendering by the HMD 102. The computer 106 is also referred to herein as a client system 106a, which in one example is a video game console.

The computer may, in some embodiments, be a local or remote computer, and the computer may run emulation software. In a cloud gaming embodiment, the computer is remote and may be represented by a plurality of computing services that may be virtualized in data centers, wherein game systems/logic can be virtualized and distributed to user over a network.

The user 100 may operate a controller 104 to provide input for the video game. In one example, a camera 108 can be configured to capture image of the interactive environment in which the user 100 is located. These captured images can be analyzed to determine the location and movements of the user 100, the HMD 102, and the controller 104. In one embodiment, the controller 104 includes a light (or lights) which can be tracked to determine its location and orientation. Additionally, as described in further detail below, the HMD 102 may include one or more lights which can be tracked to determine the location and orientation of the HMD 102 in substantial real-time during game play.

The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In some embodiments, computer 106 can execute games locally on the processing hardware of the computer 106. The games or content can be obtained in any form, such as physical media form (e.g., digital discs, tapes, cards, thumb drives, solid state chips or cards, etc.) or by way of download from the Internet, via network 110. In another embodiment, the computer 106 functions as a client in communication over a network with a cloud gaming provider 112. The cloud gaming provider 112 may maintain and executes the video game being played by the user 102. The computer 106 transmits inputs from the HMD 102, the controller 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the controller 104.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage network traffic. The connections to the network by the HMD 102, controller 104, and camera 108 may be wired or wireless. In some embodiments, content executed on the HMD 102 or displayable on a display 107, can be obtained from any content source 120. Example content sources can include, for instance, internet websites that provide downloadable content and/or streaming content. In some examples, the content can include any type of multimedia content, such as movies, games, static/dynamic content, pictures, social media content, social media websites, etc.

As will be described below in more detail, a player 100 may be playing a game on the HMD 102, where such content is immersive 3D content. The content on the HMD 102, while the player is playing, can be shared to a display 107. In one embodiment, the content shared to the display 107 can allow other users proximate to the player 100 or remote to watch along with the user's play. In still further embodiments, another player viewing the game play of player 100 on the display 107 may participate interactively with player 100. For example, a user viewing the game play on the display 107 may control characters in the game scene, provide feedback, provide social interaction, and/or provide comments (via text, via voice, via actions, via gestures, etc.,) which enables users that are not wearing the HMD 102 to socially interact with player 100, the game play, or content being rendered in the HMD 102.

Figure 1B:
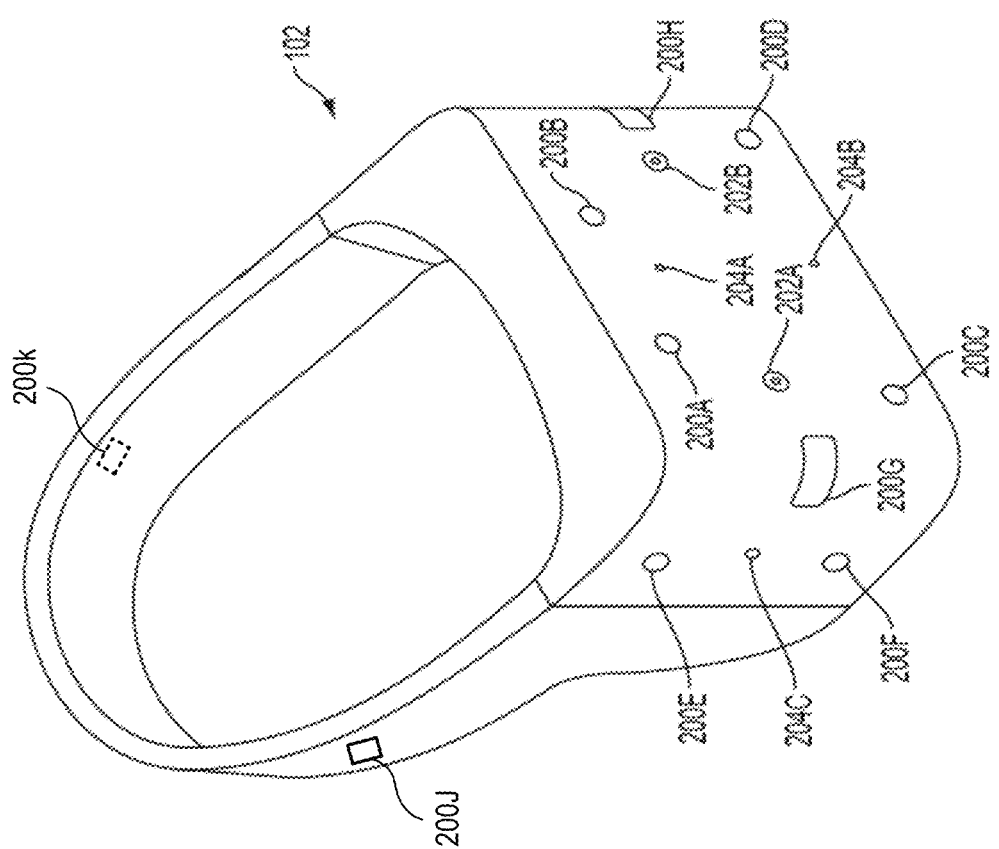
FIG. 1B illustrates a head-mounted display (HMD), in accordance with an embodiment of the invention.

FIG. 1B illustrates a head-mounted display (HMD), in accordance with an embodiment of the invention. As shown, the HMD 102 includes a plurality of lights 200A-H, J and K. Each of these lights may be configured to have specific shapes and/or positions, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device. In some embodiments, inertial sensors are disposed in the HMD 102, which provide feedback regarding positioning, without the need for lights. In some embodiments, the lights and inertial sensors work together, to enable mixing and selection of position/motion data.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated embodiment, the HMD 102 is shown to include image captured devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B can nonetheless provide a functional equivalent of being able to see the environment external to the HMD 102 as if looking through the HMD 102.

Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 1C:
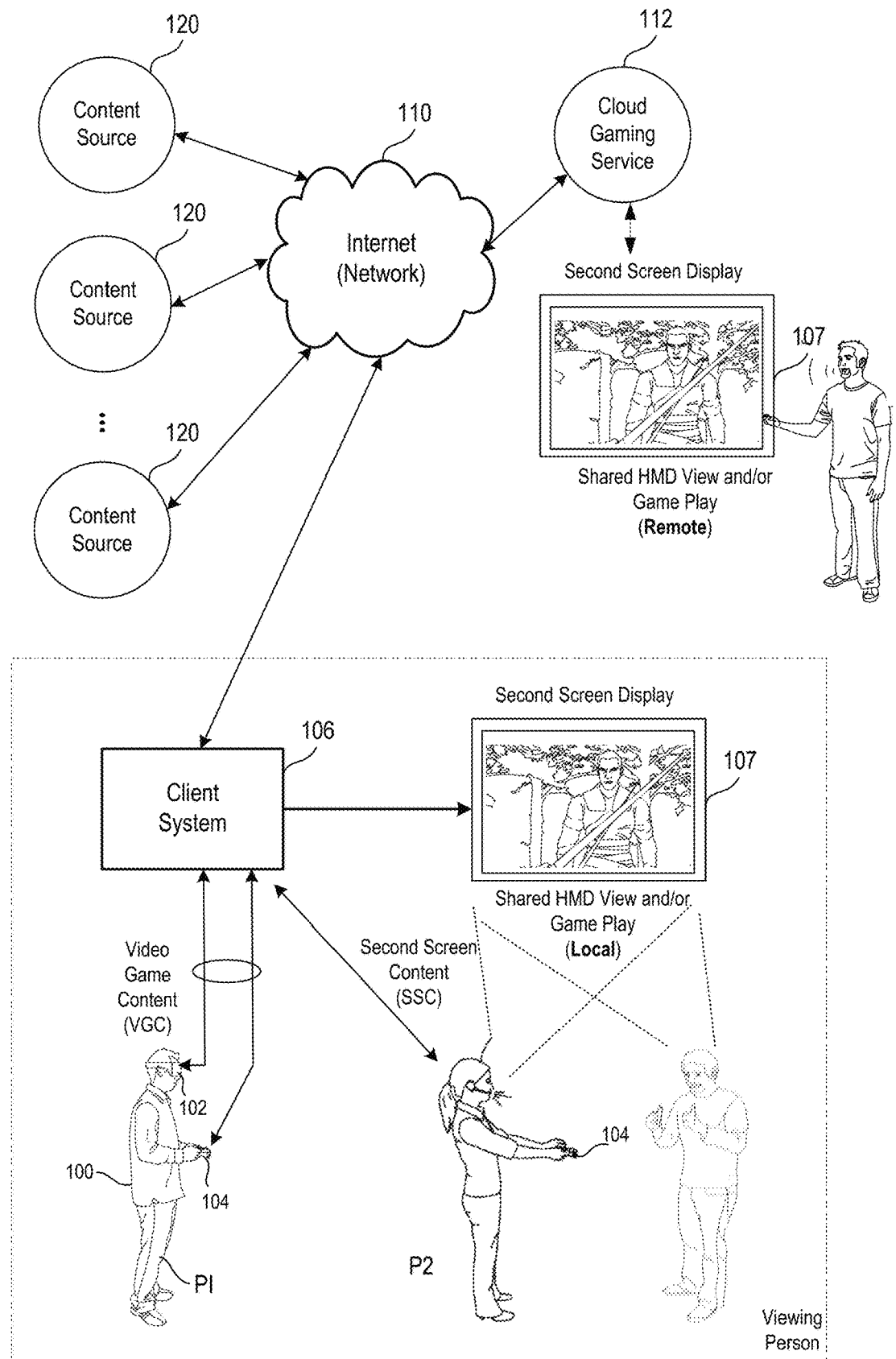
FIG. 1C illustrates an example of an HMD player sharing content to a second screen, and another player participating in the game play via the second screen, in accordance with an embodiment of the invention.

FIG. 1C illustrates one example of an HMD 102 user interfacing with a client system 106, and the client system 106 providing content to a second screen display, which is referred to as a second screen 107. As will be described below, the client system 106 may include integrated electronics for processing the sharing of content from the HMD 102 to the second screen 107. Other embodiments may include a separate device, module, connector, that will interface between the client system and each of the HMD 102 and the second screen 107. In this general example, user 100 is wearing HMD 102 and is playing a video game using controller 104. The interactive play by user 100 will produce video game content (VGC), which is displayed interactively to the HMD 102.

In one embodiment, the content being displayed in the HMD 102 is shared to the second screen 107. In one example, a person viewing the second screen 107 can view the content being played interactively in the HMD 102 by user 100. In another embodiment, another user (e.g. player 2) can interact with the client system 106 to produce second screen content (SSC). The second screen content can be produced by a player also interacting with the controller 104 (or any type of user interface, gesture, voice, or input), and may be produced as SSC to the client system 106, which can be displayed on second screen 107 along with the VGC received from the HMD 102.

Accordingly, the interactivity by other users who may be co-located or remote from an HMD user can be social, interactive, and more immersive to both the HMD user and users that may be viewing the content played by the HMD user on a second screen 107. As illustrated, the client system 106 can be connected to the Internet 110. The Internet can also provide access to the client system 106 to content from various content sources 120. The content sources 120 can include any type of content that is accessible over the Internet.

Such content, without limitation, can include video content, movie content, streaming content, social media content, news content, friend content, advertisement content, etc. In one embodiment, the client system 106 can be used to simultaneously process content for an HMD user, such that the HMD is provided with multimedia content associated with the interactivity during gameplay. The client system 106 can then also provide other content, which may be unrelated to the video game content to the second screen. The client system 106 can, in one embodiment receive the second screen content from one of the content sources 120, or from a local user, or a remote user.

FIG. 2A illustrates one example of gameplay using the client system 106 that is capable of rendering the video game content to the HMD 102 of user 100, and also share video content of the gameplay to a second screen 107. In this illustration, the game content provided to the HMD is in a rich interactive 3-D space. The content, as should be understood, would not be automatically displayable on a two-dimensional display. Accordingly, the client system 106 is configured to process the three-dimensional interactive content that is resulting from the gameplay by the HMD user and then display the video content on the second screen 107 in an undistorted format.

In this manner, any person that may be co-located with the HMD user can view the content being played by the HMV user on the second screen 107. By sharing the content to the co-located person, the immersive interactive activity experience by the HMD user can be shared to others, which will improve the social interactive interchange between the HMD user and any other person located proximate to the HMD user. As mentioned above, the cloud gaming service 112 can also provide for access to various games 130, which can be accessible to the user of the HMD 102, for play on the client system 106. The game content can be downloaded to the client system 106 or can be executed in one embodiment by a cloud processing system. Cloud gaming service 112 can also include a database of users 140, which are allowed to access a particular game, by particular games, share experiences with other friends, post comments, and manage their account information.

The cloud gaming service can also store game data 150 for specific users, which may be usable during gameplay, future gameplay, sharing to a social media network, or for storing trophies, awards, status, ranking, etc. Social data 160 can also be managed by cloud gaming service 112. The social data can be managed by a separate social media network, which can be interfaced with cloud gaming service 112 over the Internet 100. Over the Internet 100, any number of client system 106 can be connected for access to the content and interaction with other users.

Continuing with the example of FIG. 2A, the three-dimensional interactive scene viewed in the HMD can include gameplay, such as the characters illustrated in the 3-D view. One character, e.g. P1 can be controlled by the user 100 that is wearing the HMD 102. This example shows a combat scene between 2 players, wherein the HMD user 100 is fighting with another character in the 3-D view. The other character can be an AI (artificial intelligence) character of the game, or can be controlled by another player or players (Pn).

In one embodiment, the share 2-D view provided to the second screen 107 can include more or less of the views provided via the HMD 102. In some examples, less of a view is provided due to the formatting required to present a 2-D view that is extracted, chopped, and/or undistorted from the original 2-D view provided in generated for the HMD 102.

FIG. 2B illustrates an example where the client system 106 can be configured to present independent content to the second screen 107. The independent content can be, for example independent of the gameplay content experience by user 100 wearing HMD 102. The client system 106 can be configured to process both the content being delivered to the HMD 102 and also process the content provided to the second screen 107, which may be obtained from any content source 120. In this example, the user that is co-located may choose to utilize the client system 106 to also view a movie, which is not related to the video gameplay presented in the HMD 102.

In one example, the content viewed in second screen 107 can be dynamically switched. For example, the co-located person can be viewing a movie on the second screen 107 and at some point in time the user 100 playing again with the HMD 102 can decide to share some or all of the content that was played using HMD 102. The shared content can be, for example a portion of the interactive video scenes that the HMD user had just played. In one example, the user may decide to share a clip of a fight scene, an interesting interactive maneuver, a terrain entered, a winning event, etc.

The sharing, which may be triggered by the selection of a share button on the controller 104 can then transition the second screen 107 to show the video of the scene, which would then discontinue showing the independent view of the movie. The independent view the movie can be paused while the shared interactive scene is viewed on the second screen 107 and then the movie can be resumed or ended, depending on user input.

FIG. 2C illustrates an example where a player is co-located with the player 100 that is wearing HMD 102. During gameplay on the HMD 102, the client system can also enable another user to play in the game or interact in the game being played by the user wearing the HMD 102. In the example fight scene, the second player P2, can be manipulating one of the characters in the fight scene with the character of player P1. As will be described below, the interactive content and social interaction by the second player is received by the client system 106 and integrated into the video content displayed in the second screen 107. The interactive content can also be shared back to the scene viewed in the HMD 102.

Figure 2D:
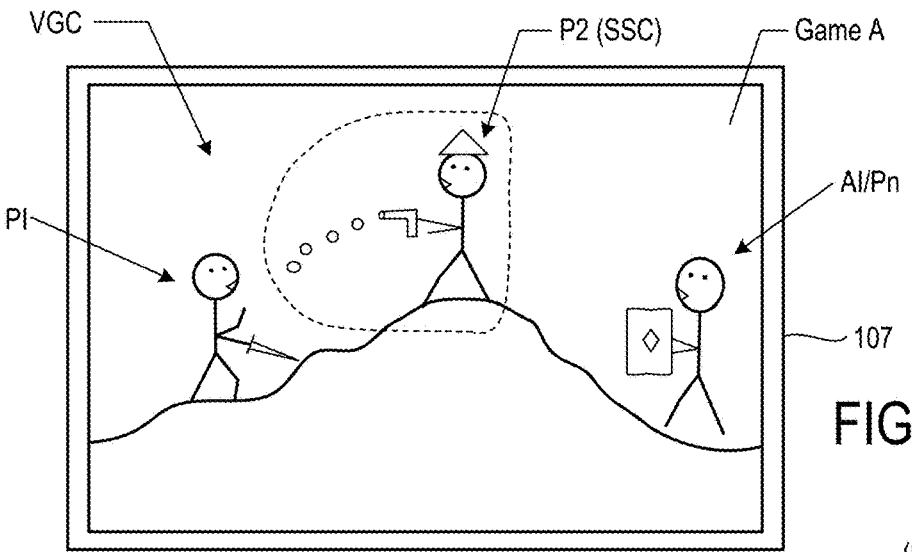
FIGS. 2D-2F illustrate examples of second screen content being integrated in the game play of the HMD, that is displayed on the second screen.

FIG. 2D illustrates an example where a second player may be interacting with the scene viewed by the HMD user. The second player can introduce new characters or actions or interfaces with the video game. This integration can include, for example the addition of a character or object, and the character object can be displayed and integrated with the scenes rendered in the HMD 102 and also rendered in the second screen 107. The interactive content, players, data, or actions produced by the second player that is now interacting in the scenes viewed and played by the HMD user 100, are represented as second screen content (SSC). The second screen content is additional data that is or allows social interaction with the content being viewed and interacted with via the HMD 102.

Figure 2E:
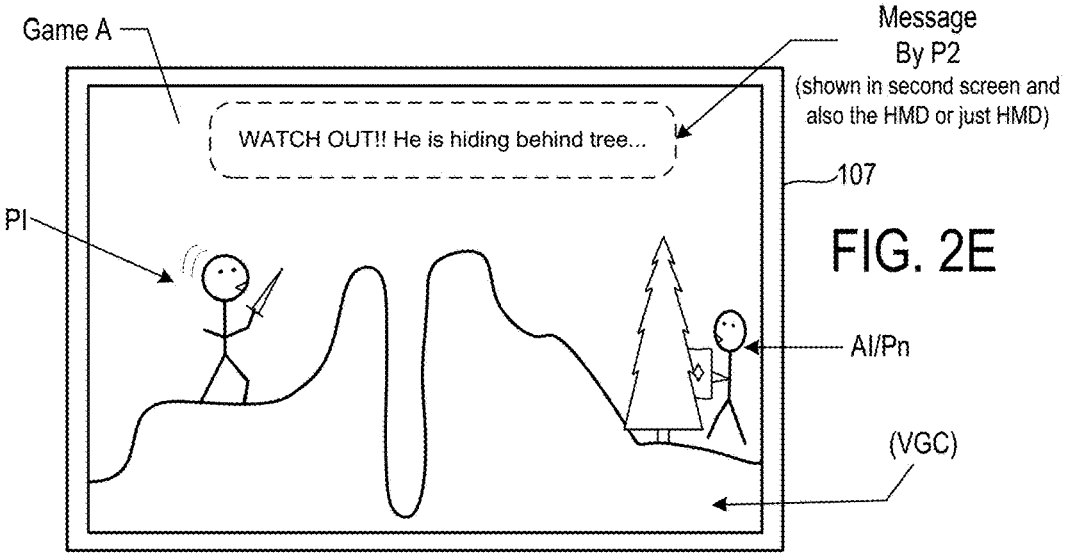

FIG. 2E illustrates an example where the second screen content is a text message that is provided by another user, such as a user that is co-located with the HMD user. In this example, the HMD user is controlling a character with a sword, and the other player can socially interact with the gameplay being displayed on the second screen 107. In this example, the other player interacting with the HMD player provides a message that is overlaid into the game screen of the HMD user and also (optionally) on the second screen 107.

This example shows the user communicating socially with the HMD user, such as providing information regarding the gameplay. This information is shown as providing a message to the HMD user regarding the location of another player or AI character. The message reads "watch out!! He is hiding behind tree". Of course this is just an example and any type of message, text, icon, emoticon, graphic, combinations thereof which may be provided as second screen content that can be viewed on the second screen 107 and also on the images rendered on the HMD 102.

Figure 2F:
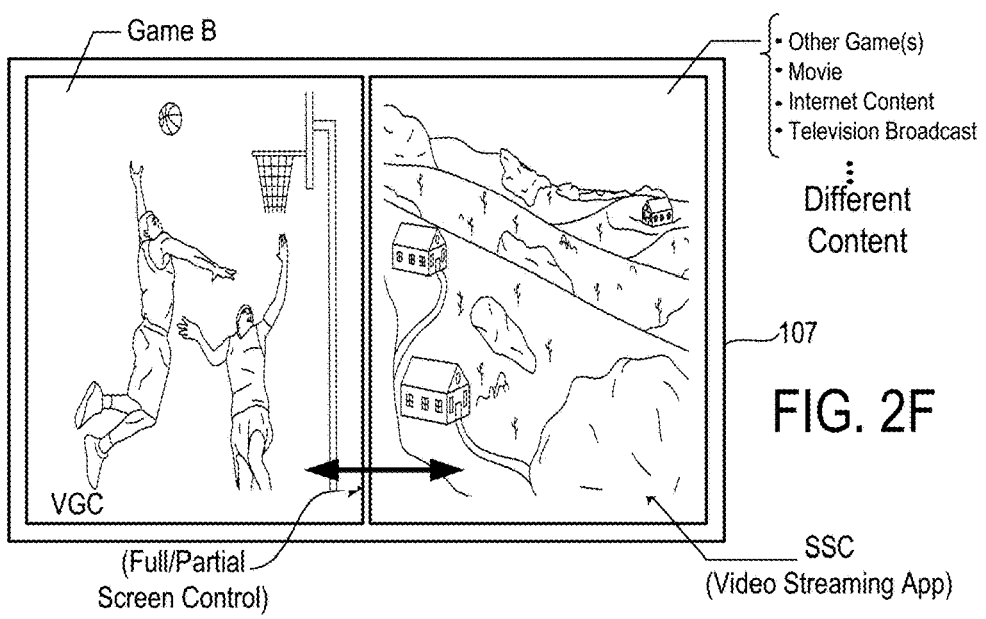

FIG. 2F illustrates an example where the second screen 107 can include split screen functionalities. Its screen functionality can allow for dynamic presentation of the HMD content in part of the second screen (showing video game content (VGC)), and different content on another part of the screen. The different content can include content obtained from any content source 120, or content obtained from other users that are socially interacting with the user wearing the HMD 102. The user wearing the HMD 102 can also socially communicate with the user viewing the second screen.

The user wearing the HMD 102 can also, for example, provide text messages, comments, audio, voice, or some type of interaction or content that is displayed on the second screen. In one embodiment, the different types of content can include other games, movies, Internet content, television broadcast, etc. In one embodiment, dynamic shifting between the content being received from the HMD 102 and other content can be transitioned on the second screen 107. An example transition can include a sliding bar which exposes either the second screen content from the HMD 102 or different content from another source. Various formats for displaying content on the second screen are possible, including picture-in-picture windows, thumbnails, overlays, etc.

Figure 3:
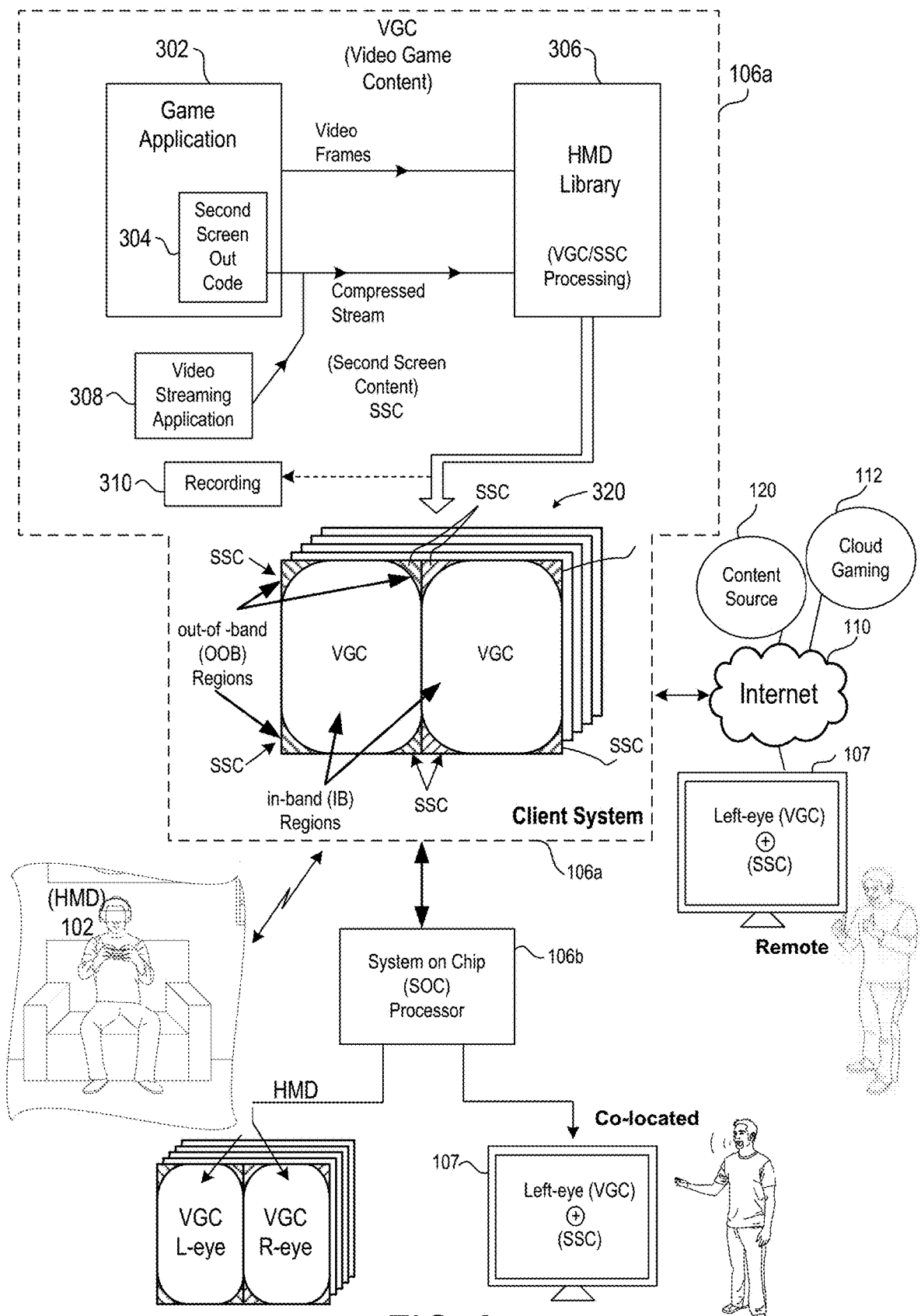
FIG. 3 illustrates an example of processing performed on video frames to integrate second screen content into video frames (in one embodiment), and a system for receiving the video frames and outputting to both the HMD and the second screen, in accordance with an embodiment of the invention.

FIG. 3 illustrates an example of the client system 106, wherein the client system 106 is defined by the client system 106a and a system on a chip (SOC) processor 106b. In one example, the client system 106a may be a computer. In another example, the client system 106b can be a game console. In one example, the SOC processor 106b can be defined by a separate module or device. For example, the SOC 106b can be defined by a device having I/O plugs/connectors and circuitry for processing content that is received from the client system 106a and split for delivery to both the HMD 102 and a second screen. In one embodiment, the I/O plugs/connectors can include various types of HDMI connectors, USB connectors, power connectors, or proprietary connectors.

The circuitry of the SOC 106b can be defined by one or more chips, which may include a processor. In some embodiments, the circuitry can be defined by firmware embodied in one or more chips. In one embodiment, a processor and memory is provided the process instructions, frame data, extraction, frame processing, video processing, etc. In some embodiments, the SOC 106b can be defined by one or more circuits that can process image data, audio data, encode data, decode data, compressed data, decompress data, processed graphics (e.g., using one or more graphics processors (GPUs).

Accordingly, it should be understood that the SOC processor 106b can be embodied as a separate device that receives the output from client system 106a and provide output to both the second screen 107 and the HMD 102. In another embodiment, the SOC processor 106b can be fully integrated into the client system 106a. In the following examples, the configuration will be defined with reference to the SOC processor 106b being a separate device.

Continuing with the description of FIG. 3, the client system 106a is configured to execute game applications 302, which may include code or logic for processing second screen content 304. In one example, the second screen out code 304, is code that is integrated with a game application 302, to allow second screen interactivity during gameplay, and also to integrate second screen content into video frames. Accordingly, game applications can be either modified to include the second screen out code 304, or can be interfaced with add-on code or modules that allow the processing of second screen out code 304.

In one embodiment, the video frames produced by the game application 302 are provided to an HMD library module 306. The HMD library module 306 is configured to process the video frames for generation of video frames that include second screen content (SSC), which is integrated into out-of-band (OOB) data of the video frames. As shown, the second screen output code 304 of the game application 302 is configured to generate a compressed stream, which in one embodiment is compressed using an H.264 standard. Of course, other standards for compression or encoding can be utilized. The compressed stream is then provided to the HMD library module 306, which is configured to integrate the compressed second screen content (SSC) into the video frames that include the video game content (VGC).

The video game content, in one embodiment, is formatted to be presented on the video frames in a left and right eye format. The left and right eye format include the video game content, while the out-of-band (OOB) data is integrated into, preferably the edges of the video frames. As will be described below, the edges of the video frames are considered out-of-band, since the content is may not displayable or viewable on the HMD 102. This therefore provides an area in the video frames that can be encoded with the second screen content at the client system 106. In another embodiment, video streaming applications 308 can provide the content that is encoded into the second screen content of the video frames.

The video streaming application 308 can be obtained from a content source 120, which can be obtained over the Internet 100. The game application 302, in one embodiment can be obtained from cloud gaming 112, when the gaming application is executed using online streaming functions. In still another embodiment, content being executed by the client system 106a can also be saved to memory, such as to allow recording 310 of gameplay. The recording of gameplay can be occurring in a buffered format, so as to allow sharing of part or all of the gameplay with another user.

As mentioned herein, the sharing can be triggered by any input. The sharing can be triggered by selection of a sharing button on the controller, by voice input, by a gesture input, or by reaching some point in an application or game scene. The video frames 320, will now include the video game content (VGC) and the second screen content (SSC) that was compressed and integrated into the out-of-band (OOB) areas of the video frames 320. At this point, the output of the client system 106a will include the stream of frames 320, which are received by the SOC processor 106b. The SOC processor 106b is configured to receive the frames 320, and process the frames so that the video game content can be rendered to the HMD 102, as well as providing the video game content (VGC) along with second screen content (SSC) (if any), to the second screen 107. As shown, some embodiments will include providing a live (or recorded) video stream to a remote location, so another person may play or view the streamed game content. The processing performed by SOC processor 106b, and components utilized for processing the frames will be described in greater detail below with reference to FIGS. 5 through 8.

Figure 4:
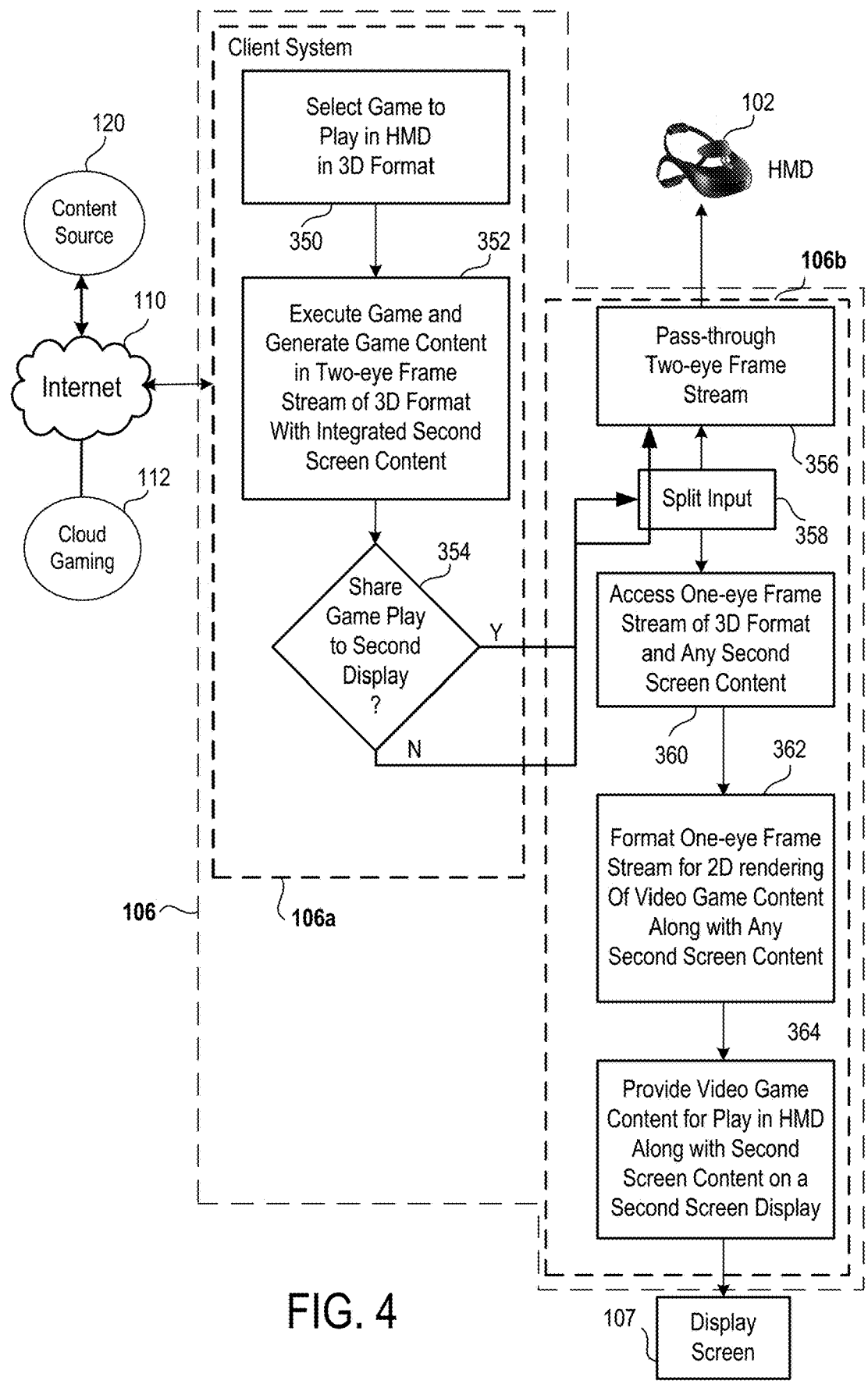
FIG. 4 illustrates example processing performed by the system to enable sharing of HMD content to a second screen, in accordance with an embodiment of the invention.

FIG. 4 illustrates an example of processing performed by the client system 106a and the SOC processor 106b. The example processing, in one embodiment, the scribe method operations that can be performed by the systems to provide interactive immersive content to HMD 102 and sharing of content to second screen 107. In this example, the client system 106a is interfaced with the Internet 110. Connection to the Internet, in one embodiment, is not required. When Internet connection 110 is present, content sources 120 can be accessed by client system 106a, as well as cloud gaming 112.

In one example, the client system 106a can allow user to select 350 again the play using the HMD, so as to render three-dimensional content. The selection of games can include allowing that HMD user to select one or more games from a menu, from a display screen, from a listing, from games available to the server, and or games available locally in storage or a physical media. The games utilized by the HMD, to allow for the second screen sharing may include second screen out code, which will allow for the processing of the second screen content for integration into the video frames 320. In other embodiments, the game applications 302 need not be modified, and other code enabling second screen content to be displayed can be processed by the client system 106a and/or the SOC processor 106b.

In operation 352, a game is executed and will generate gain content. The gain content is presented and generated so that each eye of the user will see different frame data, such that the frame data can present immersive 3-D formats viewable through the HMD. In one embodiment, the execution of the game can include the processing of the screen out code 304, which generates the second screen content, which may be integrated with the content produced by the execution of the video game. In operation 354, a determination is made as to whether gameplay should be shared to a second display.

In some embodiments, the user may not wish to share the content of the HMD 102 to a second screen. In some embodiments, the user may decide to only share contents to a second screen for specific scenes, events, or clips. When the user decides to share to a second screen, the content is sent to the SOC processor 106b. The content is sent to a split input 358, which will handle splitting the input of the video frames so that the video game content in 3-D format can be passed through to the HMD the operation 356. The split input 358, is provided to define a logical operation of splitting content, but not necessarily a physical splitter.

The split input 358 will therefore communicate to operation 360, where logic will access the frame stream to identify the content of one eye of the HMD as well as identify any second screen content that may be present in the out-of-band (OOB) data of the frames, to produce the second screen content. In operation 362, the content for the one eye (video game content) is formatted for rendering in a 2-D representation, along with any integrated second screen content. The formatted video stream having a second screen content is then provided to the second screen, an HMD in operation 364. This content can then be displayed on the display screen 107. As such, the SOC processor 106b will function as a logical splitter that receives output from the client system 106a and provides content to both the HMD 102 and the second screen 107.

Figure 5:
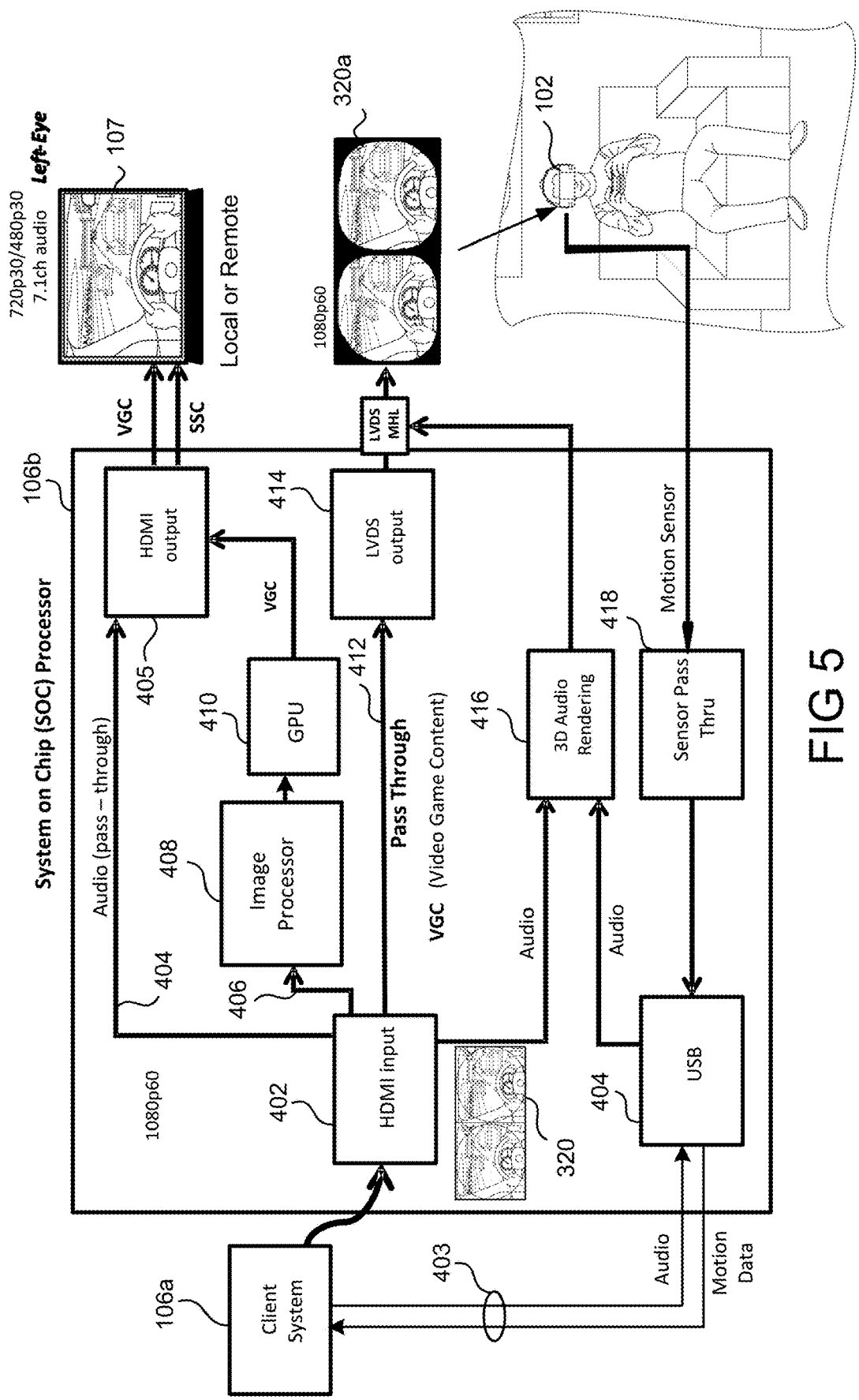
FIG. 5 is an embodiment where second screen content (SSC) (e.g., which in this example is VGC), is rendered on the second screen is simply image data and audio data, which mirrors the content being rendered in the HMD, in accordance with an embodiment of the invention.

In one embodiment, with reference to FIG. 5, a system for processing video frames generated for a head mounted display (HMD) for sharing to a second screen is provided. The system includes a client system 106a having a processor for generating video frames, e.g., 320—see FIG. 3, in response to interactive game play of a video game using the HMD. The generated video frames including in-band regions that include the video game content (VGC) to be displayed on the HMD and out-of-band (OOB) regions that include second screen content (SSC). The system can include a system-on-a-chip (SOC) processor (106b) having an input interface for receiving the generated video frames. The SOC processor includes extract logic 430 for extracting the SSC from the out-of-band regions. Also included is a graphics processor unit (GPU) 410 for selecting a portion of the generated video frames and formatting for display on the second screen. The extracted SSC and the portion of the generated video frames are provided to a first output interface 405 of the SOC processor. The generated video frames received via the input interface are provided as a pass-through to a second output interface 414 of the SOC processor. The first output interface of the SOC processor is connectable to the second screen 107, and the second output interface of the SOC process is connectable to the HMD 102.

In some implementations, the SOC processor includes a codec module for decoding the SSC extracted by the extract logic. In some implementations, the portion of the generated video frames, is selected by the GPU includes video game content (VGC) that is predefined for display to one eye in a display of the HMD, the portion further excluding the OOB regions.

In some implementations, the formatting by the GPU includes performing an un-distortion function to the VGC in the portion, the un-distortion function removes graphic effects that are native for display in the HMD. The formatting by the GPU includes a cropping function and a scaling function. The cropping function and scaling function processed to fit a native display format of the second screen, that is different than a native format of the HMD. In some embodiment the SOC processor further includes an audio pass-through 404 communicated between the input interface 402 and the first output interface 405.

In some implementations, the SOC processor further includes a USB module input for connection with the client system. The USB module is configured to receive audio and output motion data obtained from the HMD back to the client system. In one example, the USB module communicates the received audio from the client system to a 3D audio rendering module for delivery to the HMD. The 3D audio rending module further configured with an input for receiving audio from the input interface.

In some implementations, the SOC processor further includes a sensor pass-through module for receiving motion data from the HMD. The motion data is communicated to the USB module for communication to the client system. The motion data identifies or is data for motion of the HMD that is used by the client system to modify the interactive game play of the video game (e.g., as seen from the stand point of the HMD).

Figure 6:
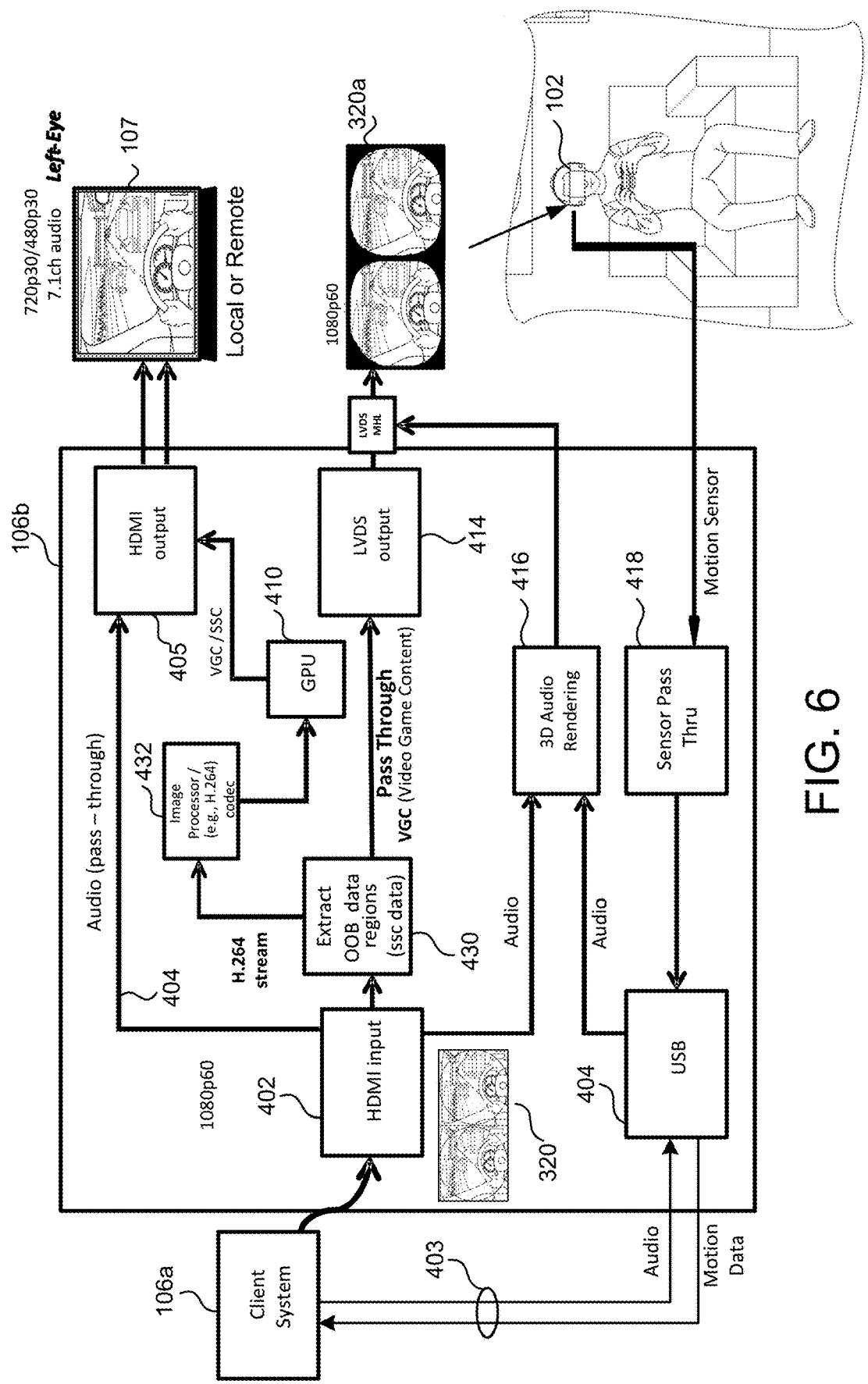
FIG. 6 illustrates one example where the out-of-band (OOB) data is pre-processed and embedded into the image frames produced by the client system, so that SSC can be displayed on the second screen along with the VGC, in accordance with an embodiment of the invention.

In some implementations, the system includes a camera 108 input received by the client system 106. The camera input configured to capture image data of a scene (e.g., see FIG. 1A) that includes the HMD. The captured image data used by the client system to modify or not modify (based on game logic) the interactive game play of the video game. A motion pass-through module 418 in the SOC processor 106b for receiving motion data from the HMD 102 is provided. The motion data is used by the client system to further modify the interactive game play, if game logic determines that modification is needed, of the video game. Modifications in the interactive game play are rendered in the video frames produced by the client system. The video frames are pass-through the SOC processor to the HMD and processed by the SOC processor for sharing to the second screen via the SOC processor. In some implementations, wherein the extract logic operates on the video frames received from the input interface, e.g., as shown in FIG. 6, 430.

FIG. 5 illustrates one example embodiment, where a system on a chip (SOC) processor 106b implements processing for rendering content for a second screen 107, along with content for the HMD 102, in accordance with one embodiment. In this example, the client system 106a provides as output video frames from a frame buffer to an HDMI (high definition multimedia interface) input 402. The embodiments envision that other types of connectors/interfaces are also possible, and no limitation should be made to the use of HDMI. The video format, in one embodiment, is configured to render a 1080p quality image, at 60 frames per second or 30 frames per second, or at any desired frame per second rate (which can vary depending on the implementation). In some embodiments, in addition to 1080p, other formats may include 1080i, 720p, 480p, 480i, 1440p (2560× 1440) WQHD, 4K (3840×2160) @ various frame rates (60 hz, 75 hz, 90 hz, 100 h, 120 hz, etc. Although these formats are proved as examples, other formats are also possible, depending on the desired implementation. In one embodiment, more or less than 60 frames is output to a display (e.g., 30 frames per second (or more or less)). In one embodiment, the format of the image frames received from the HDMI input 402 have a standard YUV422. It should be understood that other standard formats may also be used, and this standard format is just one example.

The audio component for the second screen 107 is passed via 404 to an HDMI output 405. The video component is passed to an image processor 408 component, that is configured to process the frame data received from the HDMI input 402, before passing the image data to a graphics processing unit 410. In one embodiment, the image processor 408 component is configured to perform tiling, which clusters a linear input of image data into block clusters. By tiling the image data into block clusters, the GPU 410 is able to more efficiently access memory and process the image data for output to the HDMI output 405. In one embodiment, the GPU 410 processes instructions for selecting a subset of the image received by HDMI input 402 and obtained from image processor 408 for processing. Selection of a subset of the image can include, for example, selecting a portion of the image that includes what would be seen by a left (or right) eye of a user via the HMD 102. The GPU 410, in one embodiment, can perform cropping of the image frames to select one eye of image data from the received frames. In one embodiment, the GPU 410 is further configured to process instructions to un-distort the image data selected, so that the data can be displayed on second screen 107 in a non-3D format. The un-distort operation can include filtering out out-of-band (OOB) data, and removing image warping that was originally added and/or designed for the HMD 102.

The HMD 410 can also execute instructions to provide scaling, which will enable display on specific second screens. For instance, the scaling can be automatic for an anticipated screen size or format, can be custom set by a user, and/or can be detected by the SOC processor 106*b* or client system 106*a*. By processing this additional processing by GPU 410, it is possible to render a flatter image on the second screen 107, as if the image had intentionally been designed for the second screen 107. The output of the GPU 410, may, in one embodiment, be in a standard video format, such as YUV422, or another standard that is best suitable for the display device that will function as the second screen.

In one embodiment, the video frames received by the HDMI input 402 are passed through to an output, such as LVDS (low voltage differential signal) output 414 and to an LVDS HML connector. The HMD 102, in one example, is connected by a wire to the LVDS HML connector. In another embodiment, the output 414 can be replaced with a wireless communication circuit, which can interface with the HMD 102 over a wireless connection. In still other embodiments, the output to the HMD can use other types of connectors or cables, which are not limited to the example of LVDS.

In one embodiment, the client system 106*a* can be connected to a bi-direction link to a USB module 404. Audio input from the client system 106*a* is passed to the USB module 404, which is then passed to a 3D audio rendering module 416. The 3D audio rendering module 416 is configured to synthesize the audio that is to be passed to the HMD 102, so that audio can be rendered with reference to the 3D environment being displayed in the HMD 102. In one embodiment, the primary audio that is rendered on the HMD 102 is received directly from the client system 106*a*, via USB 404. In another embodiment, the audio rendered on the HMD 102 can also include some or all of the audio received from HDMI input 402. As shown, the feedback from the HMD 102 can include, for example, motion data from inertial sensors. As the user wears the HMD 102 and moves around during game play, the motion of the user's head can provide different perspective views into the 3D space rendered by the HMD.

The motion data is then passed to a sensor pass through 418, which is then communicated to a USB module 404. The motion data is then communicated back to the client system 106*a*, which can use the motion information to adjust the rendering of the video, e.g., based on the interactive scene being viewed/played by the user via the HMD 102. As mentioned above, other feedback of the user's position/movement can be received by the client system 106*a*. For example, image data can be captured of the user (e.g., as shown in FIG. 1A), and that data image can be used along with the motion/inertial data to influence, change, and modify the content of the video being rendered on the HMD during the interactive game play.

In the example of FIG. 5, the second screen content (SSC) rendered on the second screen 107 is simply image data and audio data, which mirrors the content being rendered in the HMD 102. In this example, similar to FIG. 2A, other persons in the vicinity of game play can view, on the second screen the immersive experience of the HMD user.

FIG. 6 illustrates one example where the out-of-band (OOB) data is pre-processed and embedded into the image frames produced by the client system 106*a*. The OOB data can include game play by other users, messages, participation in game play, moving of characters, changing of content, interfacing with characters of the main user playing on the HMD, sharing of text messages, sharing of game related data, sharing of game metrics, sharing social content, content regarding chat messaging, text messaging, video messaging, or other non-game related content.

As discussed above, the client system 106*a* is configured to process the second screen content (SSC) for integration into video frames as compressed OOB data (e.g., compressed data provided in the edges of the video frames). The term OOB data is used herein to describe data that is generally not rendered on a display of the HMD. The edges of images frames, when rendered in the HMD are generally not viewable by the user, and as such, this space in the frame data can be used to store compressed (or uncompressed) second screen content. In some embodiments, audio content is also stored or integrated in the OOB data of the image frames.

Continuing with the example of FIG. 6, the HDMI input 402 is shown passed to a module 430 that is configured to receive the image data and also extract the OOB data. In one embodiment, the content stream that is embedded in the OOB data can be in the range of 90 megabits per second (or greater), which can allow for a rich interactive experience on the second screen 107.

As noted above, the OOB data can be, in one embodiment, compressed by the client system 106*a* when the OOB data is integrated in the image frame edges. The compressed/encoded OOB data, in one embodiment, is encoded using an encoder using an H.264 encoding format. The extracted OOB data is therefore shown as an H.264 stream that is passed to an image processor/H.264 codec 432. In this example, the H.264 codec is configured to decode the video stream for the second screen content (SSC). The SSC is then processed by image processor processing. The image processor processing, as described above with reference to FIG. 5, also processes the received image data (e.g., the image data that includes the left and right image data of the video game content). As described above, image processor processing is configured to tile the image data in block clusters, which makes image processing by the GPU 410 more efficient. The GPU 410, as in FIG. 5, performs un-distortion, cropping, and scaling.

The cropping can include removal of any edge content (OOB data) if present, and selection of a portion of the image (e.g., the left eye image frame content). In this manner, the left eye-image content, in an undistorted form can be output to the second screen 107. In addition, in this embodiment, the SSC that was extracted from the OOB data can be integrated with the rendered image shown on the second screen 107. For example, in addition to showing the content of the left eye video on the second screen 107, additional content that was incorporated into the edges of the image frames can be rendered along with the image data from the HMD.

FIGS. 2C-E above described this feature, which may enable others to socially interact with the user that is wearing the HMD. For example, in the OOB data, user interactive commands, data, characters, communication, etc., may be presented during and along with the HMD data. In additional to rendering the SSC obtained from the OOB data on the second screen 107, the content can be rendered back to the image content displayed in the HMD. As such, users viewing the second screen 107 (e.g., FIG. 2C), can play games, interact, socialize, talk, text, etc., with a user that is wearing an HMD 102.

Figure 7:
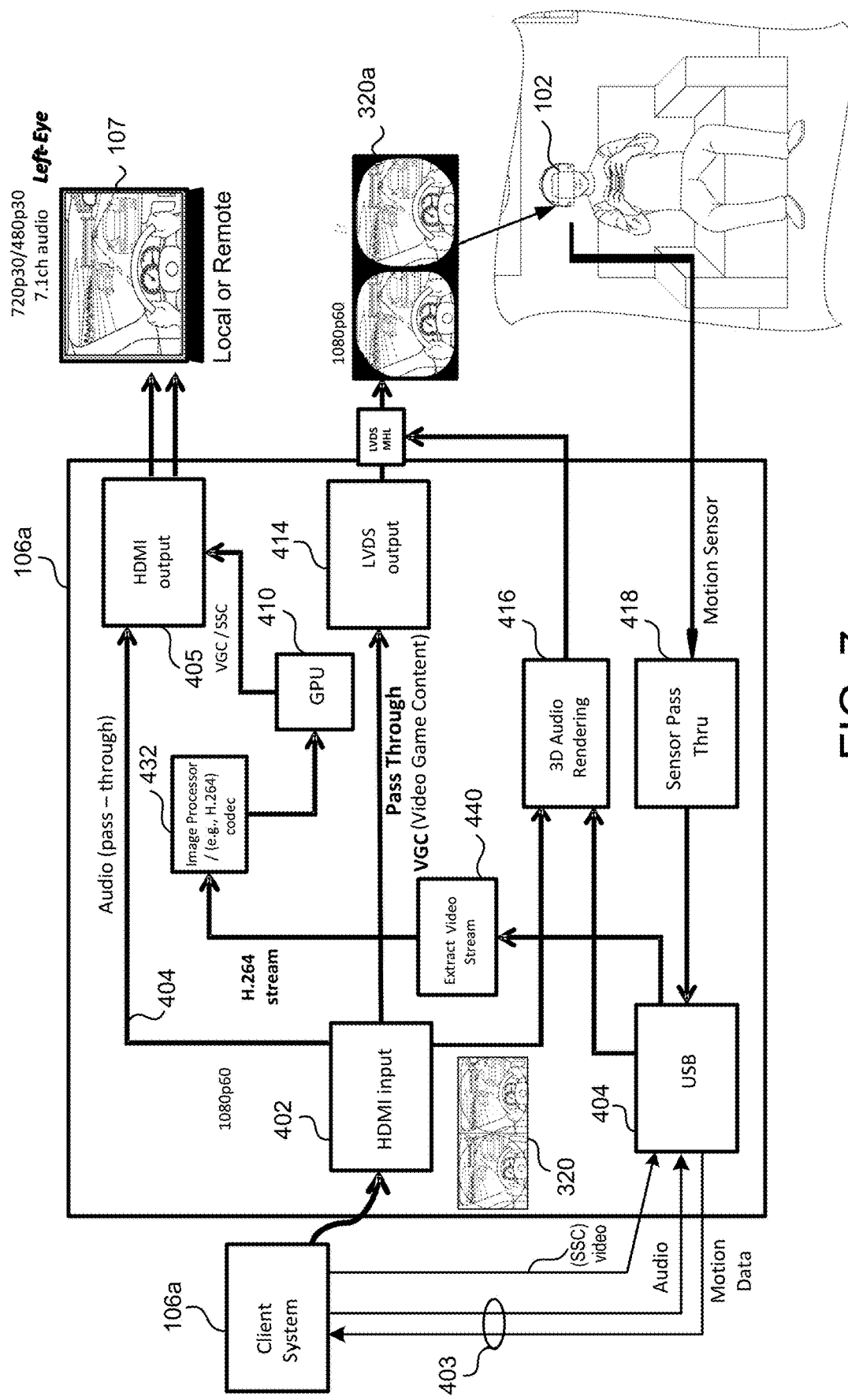
FIG. 7 illustrates alternative embodiment of the SOC processor, wherein the second screen content (SSC) that is added to the video game content (VGC) shown on the second screen is passed via the USB module, in accordance with an embodiment of the invention.

FIG. 7 illustrates alternative embodiment of the SOC processor 106*b*. In this embodiment, the second screen content (SSC) that is added to the video game content (VGC) shown on the second screen 107 is passed via the USB 404 module. This is instead of integrating compressed SSC data into the video frames, as described with reference to FIG. 6. In some embodiments, a mix of the embodiment of FIGS. 6 and 7 are envisioned.

Continuing with the embodiment of FIG. 7, the USB module 404 is configured to receive second screen content (SSC) directly from the client system 106a. The video of the SSC is extracted in module 440. In one embodiment, the video that provides the SSC is compressed/encoded using an H.264 protocol. The extracted video stream, being in H.264 format is passed to image processor/H.264 codec 432. In this module, the video is first decoded by the H.264 codec and then processed to produce tiled video block data, for more efficient processing by the GPU 410. The GPU 410 then outputs the video stream in 2D format for the video game content (VGC) along with the SSC content that was extracted in module 440. The output of HDMI output 405, provided to second screen 107 therefore includes video consistent with the content that is viewed in the HMD 102, along with SSC (e.g., social content, interactive game content, social communication data, etc.).

Figure 8:
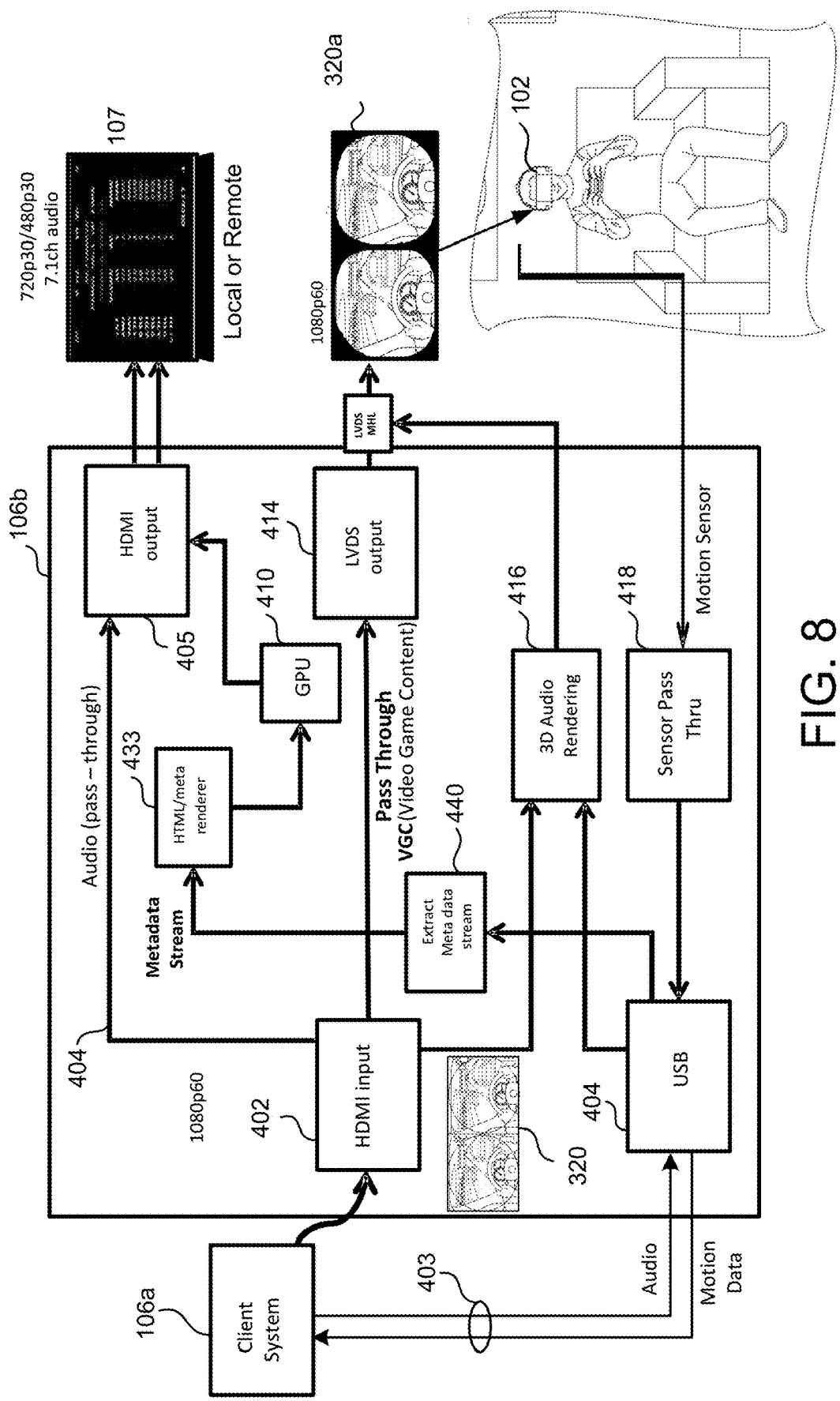
FIG. 8 includes yet another embodiment, wherein the SSC is received at a USB module in the form of HTML data, in accordance with an embodiment of the invention.

FIG. 8 includes yet another embodiment, wherein the SSC is received at the USB 404 module in the form of HTML data. The HTML data, as is well known, is a format that is suitable for rendering web content (e.g., images, text, formatting, video, etc.). Module 440 will therefore receive a data stream that is other than the images frames rendered on the HMD 102. However, the data stream can include data that may relate to the game play, or data that can be shared on the second screen 107. The data shared to the second screen 107 can also be shared to the HMD 102. Thus, in the example of FIG. 7, the second screen 107 can provide web content, such as metrics, statistics, or other information that may be relevant to a user.

As mentioned above, other examples may also include the ability of the SOC processor 106b to render content from other sources, e.g., moves, videos, images, data, while the HMD user is playing a game. The other sources, for example, can integrate the data similar to the way SSC data is provided. For example, the SSC data (data from other sources, e.g., moves, or other web/storage content) can be integrated into the image frames as OOB data (e.g., as in FIG. 6), or via a separate USB port pipeline/stream (e.g., as in FIGS. 7 and 8). In still other embodiments, the SOC processor can be configured to simply share the content viewed in the HMD to the second screen, for passive viewing by a user or co-located person (e.g., as in FIG. 5).

Figure 9:
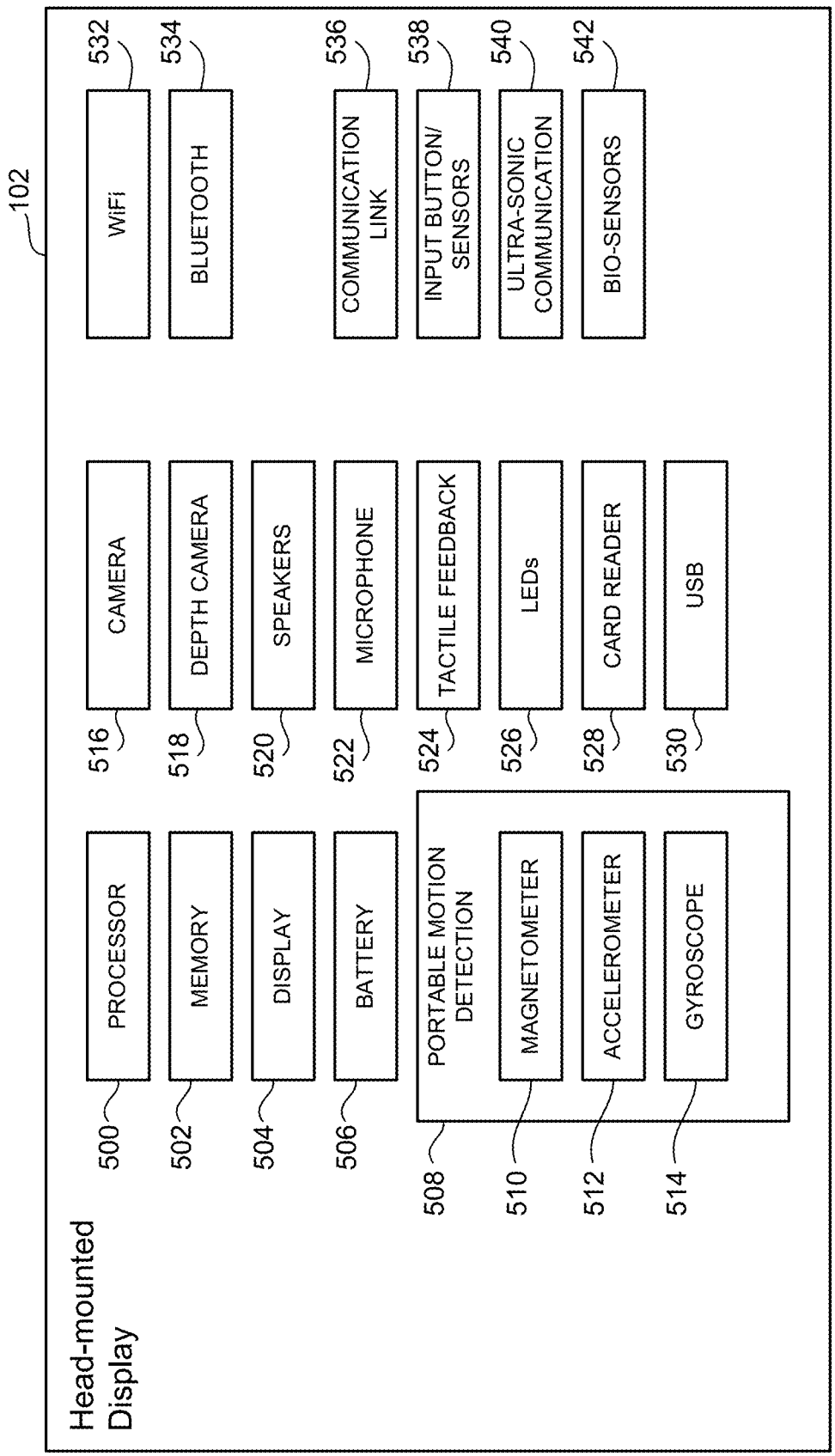
FIG. 9 is a diagram illustrating example components of a head-mounted display 102, in accordance with an embodiment of the invention.

With reference to FIG. 9, a diagram illustrating example components of a head-mounted display 102, in accordance with an embodiment of the invention. It should be understood that more or less components can be included or excluded from the HMD 102, depending on the configuration and functions enabled. The head-mounted display 102 may include a processor 500 for executing program instructions. A memory 502 is provided for storage purposes, and may include both volatile and non-volatile memory. A display 504 is included which provides a visual interface that a user may view. The display 504 can be defined by one single display, or in the form of a separate display screen for each eye. When two display screens are provided, it is possible to provide left-eye and right-eye video content separately. Separate presentation of video content to each eye, for example, can provide for better immersive control of three-dimensional (3D) content. As described above, in one embodiment, the second screen 107 is provided with second screen content of the HMD 102 by using the output for one eye, and then formatting the content for display in a 2D format. The one eye, in one embodiment, can be the left-eye video feed, but in other embodiments it can be the right-eye video feed.

A battery 506 may be provided as a power source for the head-mounted display 102. In other embodiments, the power source can include an outlet connection to power. In other embodiments, an outlet connection to power and a battery 506 may be provided. A motion detection module 508 may include any of various kinds of motion sensitive hardware, such as a magnetometer 510, an accelerometer 512, and a gyroscope 514.

An accelerometer is a device for measuring acceleration and gravity induced reaction forces. Single and multiple axis (e.g., six-axis) models are able to detect magnitude and direction of the acceleration in different directions. The accelerometer is used to sense inclination, vibration, and shock. In one embodiment, three accelerometers 512 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 510 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 512 is used together with magnetometer 510 to obtain the inclination and azimuth of the head-mounted display 102.

A gyroscope is a device for measuring or maintaining orientation, based on the principles of angular momentum. In one embodiment, three gyroscopes 514 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 516 is provided for capturing images and image streams of a real environment. More than one camera (optionally) may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 518 may be included in the head-mounted display 102 for sensing depth information of objects in a real environment.

The head-mounted display 102 includes speakers 520 for providing audio output. Also, a microphone 522 may be included for capturing audio from the real environment, including sounds from the ambient environment, speech made by the user, etc. The head-mounted display 102 includes tactile feedback module 524 for providing tactile feedback to the user. In one embodiment, the tactile feedback module 524 is capable of causing movement and/or vibration of the head-mounted display 102 so as to provide tactile feedback to the user.

LEDs 526 are provided as visual indicators of statuses of the head-mounted display 102. For example, an LED may indicate battery level, power on, etc. A card reader 528 is provided to enable the head-mounted display 102 to read and write information to and from a memory card. A USB interface 530 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 532 may be included for enabling connection to the Internet via wireless networking technologies. Also, the head-mounted display 102 may include a Bluetooth module 534 for enabling wireless connection to other devices. A communications link 536 may also be included for connection to other devices. In one embodiment, the communications link 536 utilizes infrared transmission for wireless communication. In other embodiments, the communications link 536 may utilize any of various wireless or wired transmission protocols for communication with other devices.

Input buttons/sensors 538 are included to provide an input interface for the user. Any of various kinds of input interfaces may be included, such as buttons, touchpad, joystick, trackball, etc. An ultra-sonic communication module 540 may be included in head-mounted display 102 for facilitating communication with other devices via ultra-sonic technologies.

Bio-sensors 542 are included to enable detection of physiological data from a user. In one embodiment, the bio-sensors 542 include one or more dry electrodes for detecting bio-electric signals of the user through the user's skin, voice detection, eye retina detection to identify users/profiles, etc.

The foregoing components of head-mounted display 102 have been described as merely exemplary components that may be included in head-mounted display 102. In various embodiments of the invention, the head-mounted display 102 may or may not include some of the various aforementioned components. Embodiments of the head-mounted display 102 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

In one embodiment, clients and/or client devices, as referred to herein, may include head mounted displays (HMDs), terminals, personal computers, game consoles, tablet computers, telephones, set-top boxes, kiosks, wireless devices, digital pads, stand-alone devices, handheld game playing devices, and/or the like. Typically, clients are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to client or on a separate device such as a monitor or television.

Clients are optionally configured to support more than one game player. For example, a game console may be configured to support two, three, four or more simultaneous players (e.g., P1, P2, Pn). Each of these players may receive or share a video stream, or a single video stream may include regions of a frame generated specifically for each player, e.g., generated based on each player's point of view. Any number of clients can be local (e.g., co-located) or are geographically dispersed. The number of clients included in a game system may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user.

For example, a game console and an HMD may cooperate with the video server system to deliver a game viewed through the HMD. In one embodiment, the game console receives the video stream from the video server system and the game console forwards the video stream, or updates to the video stream, to the HMD and/or television for rendering.

Clients may, but are not required to, further include systems configured for modifying received video. For example, a client may be configured to perform further rendering, to overlay one video image on another video image, to crop a video image, and/or the like. For example, clients may be configured to receive various types of video frames, such as I-frames, P-frames and B-frames, and to process these frames into images for display to a user. In some embodiments, a member of clients is configured to perform further rendering, shading, conversion to 3-D, conversion to 2D, distortion removal, sizing, or like operations on the video stream. A member of clients is optionally configured to receive more than one audio or video stream.

Input devices of clients may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

A video source may include rendering logic, e.g., hardware, firmware, and/or software stored on a computer readable medium such as storage. This rendering logic is configured to create video frames of the video stream based on the game state. All or part of the rendering logic is optionally disposed within one or more graphics processing unit (GPU). Rendering logic typically includes processing stages configured for determining the three-dimensional spatial relationships between objects and/or for applying appropriate textures, etc., based on the game state and viewpoint. The rendering logic can produce raw video that is encoded. For example, the raw video may be encoded according to an Adobe Flash® standard, HTML-5, .wav, H.264, H.263, On2, VP6, VC-1, WMA, Huffyuv, Lagarith, MPG-x. Xvid. Fmpeg, x264, VP6-8, realvideo, mp3, or the like. The encoding process produces a video stream that is optionally packaged for delivery to a decoder on a device. The video stream is characterized by a frame size and a frame rate. Typical frame sizes include 800×600, 1280×720 (e.g., 720p), 1024×768, 1080p, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In some embodiments, the client can be a general purpose computer, a special purpose computer, a gaming console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a client as defined herein. In one embodiment, a cloud gaming server is configured to detect the type of client device which is being utilized by the user, and provide a cloud-gaming experience appropriate to the user's client device. For example, image settings, audio settings and other types of settings may be optimized for the user's client device.

Figure 10:
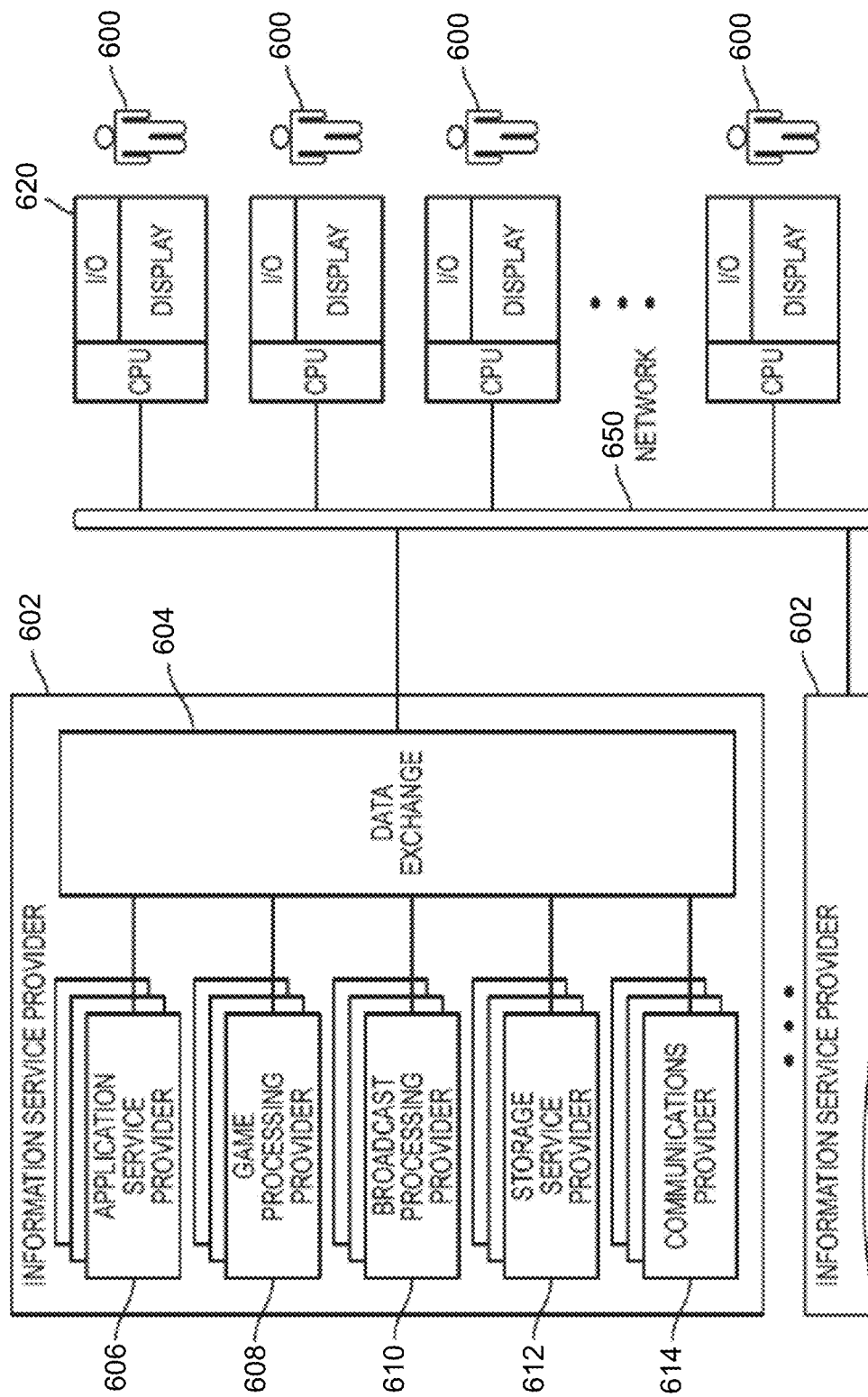
FIG. 10 illustrates components of a head-mounted display, in accordance with an embodiment of the invention.

FIG. 10 illustrates an embodiment of an Information Service Provider architecture. Information Service Providers (ISP) 670 delivers a multitude of information services to users 682 geographically dispersed and connected via network 686. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 670 includes Application Service Provider (ASP) 672, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 670 includes a Game Processing Server (GPS) 674 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 676 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 678 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 380 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 688 interconnects the several modules inside ISP 670 and connects these modules to users 682 via network 686. Data Exchange 688 can cover a small area where all the modules of ISP 670 are in close proximity, or can cover a large geographic area when the different modules are geographically dispersed. For example, Data Exchange 688 can include a fast Gigabit Ethernet (or faster) within a cabinet of a data center, or an intercontinental virtual area network (VLAN).

Users 682 access the remote services with client device 684, which includes at least a CPU, a display and I/O. The client device can be a PC, a mobile phone, a netbook, tablet, gaming system, a PDA, etc. In one embodiment, ISP 670 recognizes the type of device used by the client and adjusts the communication method employed. In other cases, client devices use a standard communications method, such as html, to access ISP 670.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A video processing interface, comprising,
   an input for receiving video of interactive content generated by a client system;
   a head mounted display (HMD) output for connecting to an HMD;
   a second screen output for connecting a display screen for rendering a view of the interactive content;
   a graphics processing unit (GPU) is configured to receive the video of interactive content produced by the client system via the input, the GPU is configured to format the video of interactive content for rendering on the display screen that is connectable to the second screen output; and
   a pass-through connection that is configured to receive the video of interactive content that is sent to the HMD output for delivery to the HMD, wherein the pass-through connection maintains a left-eye and right-eye format processed by the client system to render the video of interactive content in a three-dimensional format.

2. The video processing interface of claim 1, further comprising,
   a wireless communication circuit for communicating with the HMD via the HMD output, the wireless communication circuit is configured to deliver the video of interactive content in said three-dimensional format.

3. The video processing interface of claim 1, wherein the second screen provides a view into a scene rendered on the HMD, and the view changes based on changes in movement of the HMD.

4. The video processing interface of claim 1, further comprising,
   an audio pass-through communicated between the input and the second screen output.

5. The video processing interface of claim 1, wherein the GPU includes a cropping function or a scaling function, the cropping function or scaling function used for said formatting of the video of interactive content to a screen format of the second screen.

6. The video processing interface of claim 1, further comprising,
   an image process for cropping or scaling the video of interactive content to display on a screen format of the second screen.

7. The video processing interface of claim 1, further comprising,
   a USB device for connecting the video processing interface to the second screen.

8. The video processing interface of claim 1, further comprising a USB device for communicating audio from the client system to 3D audio rendering code for delivery to the HMD.

9. A media streaming device, comprising,
   an interface for connecting the media streaming device to a display screen;
   a head mounted display (HMD) output for connecting to an HMD over a wireless connection provided by wireless communication circuitry;

a processor for processing received video of interactive content, the processor is configured to format the video of interactive content for rendering on the display screen; and a pass-through connection that is configured to interface the video of interactive content to the HMD via the HMD output over the wireless connection, wherein the pass-through connection maintains a left-eye and right-eye format for rendering the video of interactive content in a three-dimensional format in the HMD.

10. The media streaming device of claim 9, wherein the display screen provides a view into a scene rendered on the HMD, and the view changes based on changes in movement of the HMD.

11. The media streaming device of claim 9, wherein the processor includes a cropping function or a scaling function, the cropping function or scaling function used for said formatting of the video of interactive content to a screen format of the display screen.

12. The media streaming device of claim 9, further comprising, an image process for cropping or scaling the video of interactive content to display on a screen format of the second screen.

13. The media streaming device of claim 9, further comprising, a USB interface.

14. The media streaming device of claim 9, wherein the wireless communication circuitry is configured for connection to the Internet, the internet providing access to a cloud gaming service for streaming games.

15. The media streaming device of claim 9, wherein the wireless communication circuitry is configured for connection to the Internet, the internet providing access to a cloud gaming service for sharing views of the video of interactive content.

* * * * *